US007291067B2

(12) United States Patent
Tarantino

(10) Patent No.: US 7,291,067 B2
(45) Date of Patent: Nov. 6, 2007

(54) METHOD AND SYSTEM FOR PLAYING A MULTI-PLAYER GAME

(75) Inventor: Elia Rocco Tarantino, Las Vegas, NV (US)

(73) Assignee: Colepat, LLC, North Las Vegas, NV (US)

( * ) Notice: Subject to any disclaimer, the term of this patent is extended or adjusted under 35 U.S.C. 154(b) by 662 days.

(21) Appl. No.: 10/884,457

(22) Filed: Jul. 1, 2004

(65) Prior Publication Data

US 2004/0242306 A1 Dec. 2, 2004

Related U.S. Application Data

(63) Continuation-in-part of application No. 10/636,828, filed on Aug. 6, 2003, now Pat. No. 7,081,050, which is a continuation-in-part of application No. 09/553,915, filed on Apr. 20, 2000, now Pat. No. 6,605,001, which is a continuation-in-part of application No. 09/439,934, filed on Nov. 12, 1999, now Pat. No. 6,656,047, which is a continuation-in-part of application No. 09/298,604, filed on Apr. 23, 1999, now abandoned.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .......................................... 463/22; 463/20

(58) Field of Classification Search .................. 463/22, 463/20

See application file for complete search history.

(56) References Cited

U.S. PATENT DOCUMENTS 2,205,471 A 6/1940 Fagerholm
2,812,182 A 11/1957 Fiorino
2,842,368 A 7/1958 Williams (Continued)

FOREIGN PATENT DOCUMENTS

DE 2724153 8/1978

(Continued)

OTHER PUBLICATIONS

"Creative Computing", vol. 4, No. 1, Cover page and Contents, pp. 3-4 and 132-137, Jan.-Feb. 1978.

(Continued)

*Primary Examiner*—R. Laneau
*Assistant Examiner*—Omkar A. Deodhar
(74) *Attorney, Agent, or Firm*—Weide & Miller, Ltd.

(57) ABSTRACT

A multi-player game includes both individual and bonus game aspects. Players play one or more individual games for a score. In one embodiment, game scores comprise an aggregate of scores from individual rounds of play in which indicia are displayed, held and replaced in an attempt to obtain the maximum number of matching indicia. One or more players are declared winners of the multi-player bonus event based upon game scores achieved during a predetermined interval of time. Prizes or winnings, such as all or part of a jackpot, is awarded to the winners of the bonus round. In one embodiment, players use portable devices such as cellular phones to play the game.

19 Claims, 15 Drawing Sheets

U.S. PATENT DOCUMENTS

| | | | | |
|---|---|---|---|---|
| 3,505,646 | A | 4/1970 | Affel, Jr. et al. | |
| 3,655,199 | A | 4/1972 | Ohki | |
| 3,843,133 | A | 10/1974 | Brown | |
| 4,033,588 | A | 7/1977 | Watts | |
| 4,066,264 | A | 1/1978 | Rowman | |
| 4,093,215 | A | 6/1978 | Ballard | |
| 4,126,851 | A | 11/1978 | Okor | |
| 4,193,598 | A | 3/1980 | Freese | |
| 4,247,106 | A | 1/1981 | Jeffers et al. | |
| 4,322,612 | A | 3/1982 | Lange | |
| 4,335,809 | A | 6/1982 | Wain | |
| 4,339,798 | A | 7/1982 | Hedges et al. | |
| 4,372,558 | A | 2/1983 | Shimamoto et al. | |
| 4,389,048 | A | 6/1983 | Burgess | |
| 4,467,424 | A | 8/1984 | Hedges et al. | |
| 4,494,197 | A | 1/1985 | Troy et al. | |
| 4,506,890 | A | 3/1985 | Murry | |
| 4,517,656 | A | 5/1985 | Solimeno et al. | |
| 4,564,923 | A | 1/1986 | Nakano | |
| 4,570,930 | A | 2/1986 | Matheson | |
| 4,572,509 | A | 2/1986 | Sitrick | |
| 4,614,342 | A | 9/1986 | Takashima | |
| 4,636,174 | A | 1/1987 | Andersen et al. | |
| 4,760,527 | A | 7/1988 | Sidley | |
| 4,836,553 | A | 6/1989 | Suttle et al. | |
| 4,837,728 | A | 6/1989 | Barrie et al. | |
| 4,861,041 | A | 8/1989 | Jones et al. | |
| 4,961,581 | A | 10/1990 | Barnes et al. | |
| 4,986,546 | A | 1/1991 | Cerulla | |
| 4,995,615 | A | 2/1991 | Cheng | |
| 5,031,914 | A | 7/1991 | Rosenthal | |
| 5,043,889 | A | 8/1991 | Lucey | |
| 5,129,652 | A | 7/1992 | Wilkinson | |
| 5,221,083 | A | 6/1993 | Dote | |
| 5,290,033 | A | 3/1994 | Bittner et al. | |
| 5,356,140 | A | 10/1994 | Dabrowski et al. | |
| 5,374,060 | A | 12/1994 | Goldberg | |
| 5,393,067 | A | 2/1995 | Paulsen et al. | |
| 5,417,424 | A | 5/1995 | Snowden et al. | |
| 5,462,277 | A | 10/1995 | Takemoto | |
| 5,472,195 | A | 12/1995 | Takemoto et al. | |
| 5,489,096 | A | 2/1996 | Aron | |
| 5,564,977 | A | 10/1996 | Algie | |
| 5,611,730 | A | 3/1997 | Weiss | |
| 5,669,817 | A | 9/1997 | Tarantino | |
| 5,687,968 | A | 11/1997 | Tarantino | |
| 5,732,948 | A | 3/1998 | Yoseloff | |
| 5,772,509 | A | 6/1998 | Weiss | |
| 5,788,240 | A | 8/1998 | Feinberg | |
| 5,803,451 | A | 9/1998 | Kelly et al. | |
| 5,816,918 | A | 10/1998 | Kelly et al. | |
| 5,823,874 | A | 10/1998 | Adams | |
| 5,823,875 | A | 10/1998 | Tarantino | |
| 5,833,538 | A | 11/1998 | Weiss | |
| 5,839,960 | A | 11/1998 | Parra et al. | |
| 5,848,932 | A | 12/1998 | Adams | |
| 5,964,463 | A | 10/1999 | Moore, Jr. | |
| 5,984,779 | A | 11/1999 | Bridgeman et al. | |
| 6,007,426 | A | 12/1999 | Kelly et al. | |
| 6,120,377 | A | 9/2000 | McGinnis, Sr. et al. | |
| 6,123,333 | A | 9/2000 | McGinnis, Sr. et al. | |
| 6,173,955 | B1 | 1/2001 | Perrie et al. | |
| 6,210,277 | B1 | 4/2001 | Stefan | |
| 6,213,876 | B1 * | 4/2001 | Moore, Jr. | 463/22 |
| 6,244,595 | B1 | 6/2001 | Kelly et al. | |
| 6,446,964 | B1 | 9/2002 | Kelly et al. | |
| 6,454,648 | B1 | 9/2002 | Kelly et al. | |
| 6,605,001 | B1 | 8/2003 | Tarantino | |
| 7,081,050 | B2 * | 7/2006 | Tarantino | 463/22 |

FOREIGN PATENT DOCUMENTS

| | | |
|---|---|---|
| GB | 2253299 | 2/1982 |
| GB | 2190227 | 11/1987 |

OTHER PUBLICATIONS

Author Unknown, "*Autotote Corporation Profile*", Autotote, pp. 1-5, Sep. 1993.
Author Unknown, "*Electronic Yahtzee Instructions*", Milton Bradley Company, pp. 1-2, 1995.
Author Unknown, "*Touch the Technology. The Grand Stand System*", Autotote, 27 Pages, 1993.
Author Unknown, "www.hasbro.com/yahtzee/original/index.html", Hasbro, 1 Page, 1996.
Author Unknown, "www.hasbro.com/sampler/index.html", Hasbro, 1 Page, 1996.
Author Unknown, "www.yahtzee.com", Hasbro. 2 Pages, 1996.
Author Unknown, "*Yahztee Instructions*", Milton Bradley Company, pp. 1-8, 1996.
Burns, B., "*The Encyclopedia of Games*", Barnes and Noble, Inc., pp. 198-199, 1998.
Dugdale, S., "*Using the Computer to Foster Creative Interaction Among Students*", Plato Education Group, CERL Report E-9, pp. 1-14, Oct. 1979.
Stewart, G., "*Commbat: A Tele-Game for Two*", BYTE Publications, Inc. pp. 100-104, Dec. 1981.
Stifle, J.E., "*The Plato V Terminal*", Plato Education Group, CERL Report x-50, pp. 1-58, Aug. 1977.
Wadlow, T.A., "*The Xerox Alto Computer*", BYTE Publications, Inc., In the Queue, vol. 6, No. 9, pp. 58-63, Sep. 1981.
Wells, A., Baldwin, B., and Quarterman, S., "*Documentation for Trek 2.1*", pp. 1-19, Aug. 1979.
Wasserman, K. and Stryker, T., "*Multimachine Games*", BYTE Publications, Inc., pp. 24-39.

* cited by examiner

METHOD AND SYSTEM FOR PLAYING A MULTI-PLAYER GAME

CROSS REFERENCE TO RELATED APPLICATIONS

This application is a continuation-in-part of U.S. application Ser. No. 10/636,828, filed Aug. 6, 2003, now U.S. Pat. No. 7,081,050 which is a continuation-in-part of U.S. application Ser. No. 09/553,915, filed Apr. 20, 2000, now U.S. Pat. No. 6,605,001, which is a continuation-in-part of U.S. application Ser. No. 09/439,934, filed on Nov. 12, 1999 now U.S. Pat. No. 6,656,047, which is a continuation-in-part of Ser. No. 09/298,604 filed on Apr. 23, 1999, abandoned.

FIELD OF THE INVENTION

The present invention relates generally to methods and devices for playing games, and in particular to method and systems for playing multi-player games.

BACKGROUND OF THE INVENTION

Traditional slot machine play typically involves wagering on the spin of a mechanical or video-simulated reel. No decision making is involved, other than the decision to play. No skill is involved where the outcome of such gaming is based upon chance.

The interconnection of multiple gaming machines to facilitate a gaming system with progressive jackpots is in use today. Although such wide area links involve progressive jackpots, they do not take full advantage of the potential created by the interconnection of a plurality of gaming machines. Wide area links of gaining machines typically involve traditional computer-controlled slot machines, which, although popular, do not involve a substantial skill element. Furthermore, traditional slot machines facilitate a limited persistence of play. After any given spin, a player is likely to leave the computer-controlled slot machine, because each spin is a completed cycle rather than part of an ongoing game. A game in which each spin or turn is a part of an ongoing game would be advantageous because such a system would encourage a player to continue playing in order to complete a game in progress.

Additionally, traditional slot machine play is a solitary activity. Players compete only against the house, in an introverted process in which they interact not with each other, but only with the gaming machines. With the advent of wide area links of gaming machines, a tremendous potential exists to facilitate multiple player tournaments, in which players would not only compete for the same progressive jackpots, but actually compete against each other in real time. Such multiple player gaming would be more socially interactive, and would facilitate a fun gaming dynamic.

Also, traditional slot machines are not equipped to permit a player to take a break, and to later resume game play. If a player physically leaves an individual slot machine, that player may never revisit the specific game state which the player left behind. Because players like to take short and long term breaks for a variety of reasons, a method to allow a player to save a game state and later restore the saved game would be advantageous. Players would like to be able to take breaks of any length and later resume a saved game at the same or another physical location.

SUMMARY OF THE INVENTION

The present invention provides apparatus and methods for playing one or more games. One or more embodiments of the invention comprise: (i) a multi-player event in which players play one or more games and, based upon the game play, one or more of the players are declared winners of the event; (ii) a multi-player gaining event in which the total number of potential winners of the event increases as the total number of players participating the event increases; and/or (iii) a gaming event in which a player plays one or more games are part of the event and is presented with the opportunity to win both the individual games or games as well as to participate in a bonus event.

One embodiment of the invention comprises a multi-player event in which a plurality of players play one or more games for scores, points or other value (such as winnings). In the multi-player portion of the game, the players' scores are compared in order to determine the winner or winners of the event.

In one embodiment, players play for high scores, and the player or player with the highest scores are declared the winners of the multi-player event. The game or games which the players play as part of the event may vary. In one embodiment, players play a poker game, such as one or more games of video poker. Players may also play a dice game such as the game of Check, Z Sixty-six or other games described herein or otherwise known. In one embodiment, the game may have multiple rounds, and the player plays for a total score of all rounds or of a cumulative group of games.

In embodiment, players play the one or more games for scores or values during a period of time, such as the day, week or month. The outcome of the multi-player portion of the event is determined from the game play during that period of time.

In one embodiment, players of the multi-player event have the opportunity to play for winnings associated with both the base game play and the multi-player outcome. For example, the games may be played for monetary winnings or points which may be redeemed for prizes.

In one embodiment, wagers, such as specific game wagers, access time or other fees, may be used to fund a jackpot pool. The one or more winnings of the multi-player event maybe awarded all or part of the jackpot pool. In other versions of the game, the players may play for prizes.

The games of the invention are preferably implemented via one or more gaming devices. In one embodiment, the devices comprise computer-controlled slot machines. For multiple player games, the machines are interlinked onto a local or wide-area network.

In another embodiment of the invention, the games of the invention are presented on other devices, such as personal data assistants (PDAs), cellular phones, personal computers or the like. Preferably, players provide monetary value in order to play the games, and monetary winnings are paid for winning results or outcomes. In one embodiment, a player provides a direct bet or wager in order to play a game. In another embodiment, the monetary value maybe associated with or comprise air time (such as in the case of a cellular phone) or play time, including access time, or a specific access or game fee.

In the multi-player games, the player's scores maybe stored and checked, permitting a player to determine their "standing" in the game. In one embodiment, a player may check their score by accessing a website. In one embodiment, the player or players having the highest score or scores are eligible to participate in the jackpot. If upon checking the player learns that their score is not among the highest scores, they may play the game again in an attempt to achieve a higher score.

One embodiment of the invention is a game where the total number of winners increases as the total number of players, wagers or games played, increases. In one embodiment, a first number of winners are indicated for a multi-player event. During the event, if thresholds of the number of players, wagers or games are exceeded, the number of winners which will be declared is increased. In one embodiment, increased game play thus results in a greater number of players participating in an award as winners of the event.

Further objects, features, and advantages of the present invention over the prior art will become apparent from the detailed description of the drawings which follows, when considered with the attached figures.

DETAILED DESCRIPTION OF THE INVENTION

The invention comprises methods and apparatus for presenting and playing a game. In the following description, numerous specific details are set forth in order to provide a more thorough description of the present invention. It will be apparent, however, to one skilled in the art, that the present invention maybe practiced without these specific details. In other instances, well-known features have not been described in detail so as not to obscure the invention In general, one or more embodiments of the invention comprise: (i) a multi-player event in which players play one or more games and, based upon the game play, one or more of the players are declared winners of the event; (ii) a multi-player gaming event in which the total number of potential winners of the event increases as the total number of players participating the event increases; and/or (iii) a gaming event in which a player plays one or more games are part of the event and is presented with the opportunity to win both the individual games or games as well as to participate in a bonus event. Various embodiments of the invention comprise systems for implementing the games/events of the invention.

Figure 1:
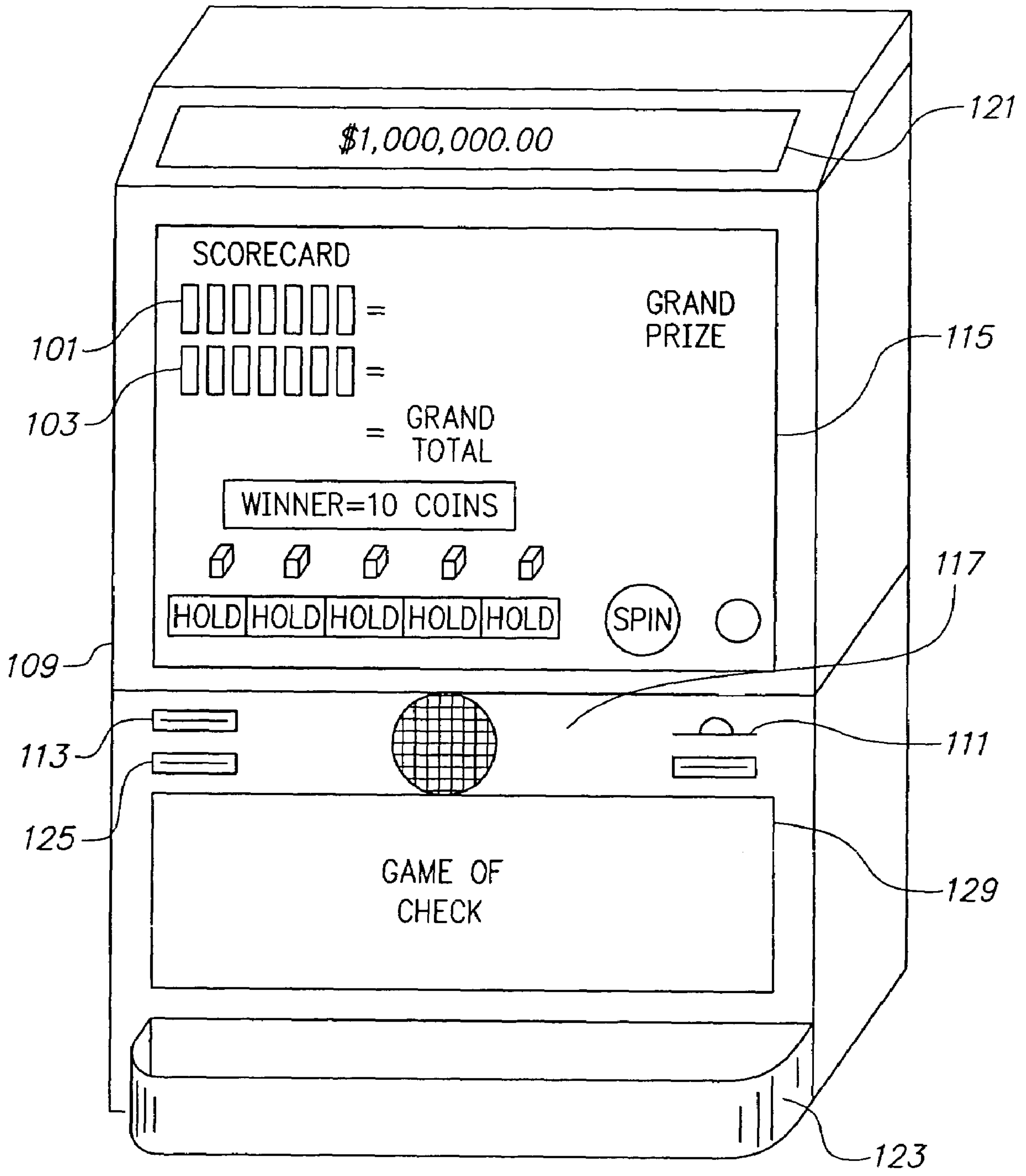
FIG. 1 is a perspective view of a computer-controlled slot machine, in accordance with one embodiment of the gaming system of the present invention.

In one embodiment of the invention, one or more games or gaming events are presented for play on a computer-controlled slot machine, for example as shown in FIG. 1. The computer-controlled slot machine 101 includes a microprocessor-controlled computer 103 within a tamper proof and lockable cabinet 109 having a coin acceptor 111 for wagers and a bill validator 113 for wagers, and preferably including a touch-sensitive display 115 for player input and game display. In addition, the computer-controlled slot machine includes a sound speaker 117 for output of digital sound and voice simulations, a tower light 119 (not shown) to indicate jackpots and other game statistics, and a meter 121 to display progressive jackpot information and other text. The computer 103 controls release of coins to a coin hopper 123 for paying players, and controls a ticket printer 125 for generating vouchers. The computer 103 also controls a machine-readable medium reading and writing device 129 for saving and restoring games in progress.

Figure 2:
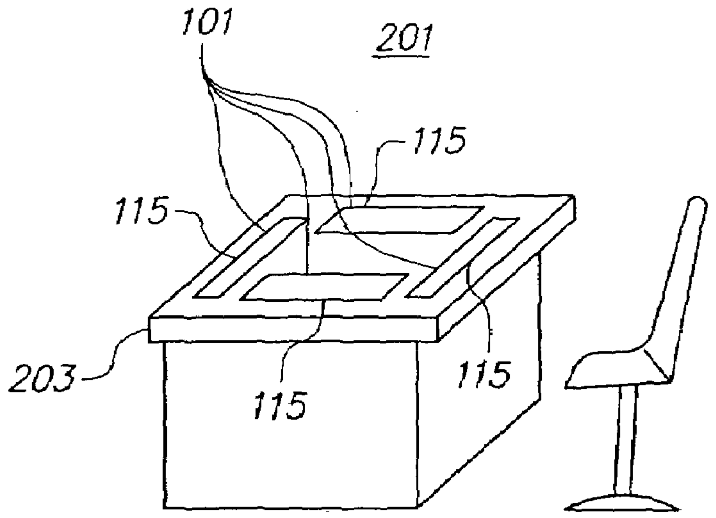
FIG. 2 is a perspective view of four computer-controlled slot machines assembled in a bar table according to another embodiment of the present invention for single or simultaneous multiple user play.

An alternative embodiment of the computer-controlled slot machine is illustrated in FIG. 2. A “bar buddy” version of a computer-controlled slot machine 201 includes all of the features of the computer-controlled slot machine 101. Each “bar buddy” computer-controlled slot machine 201 contains four such computer-controlled slot machines 101, assembled within a bar table 203. Each of the four touch-sensitive displays 115 for player input and game display are mounted in the surface of the bar table 203. The bar buddy computer-controlled slot machine 201 enables from one to four players to play games of the invention simultaneously, either against each other or against the house. The various modes of game play are detailed below.

Figure 3:
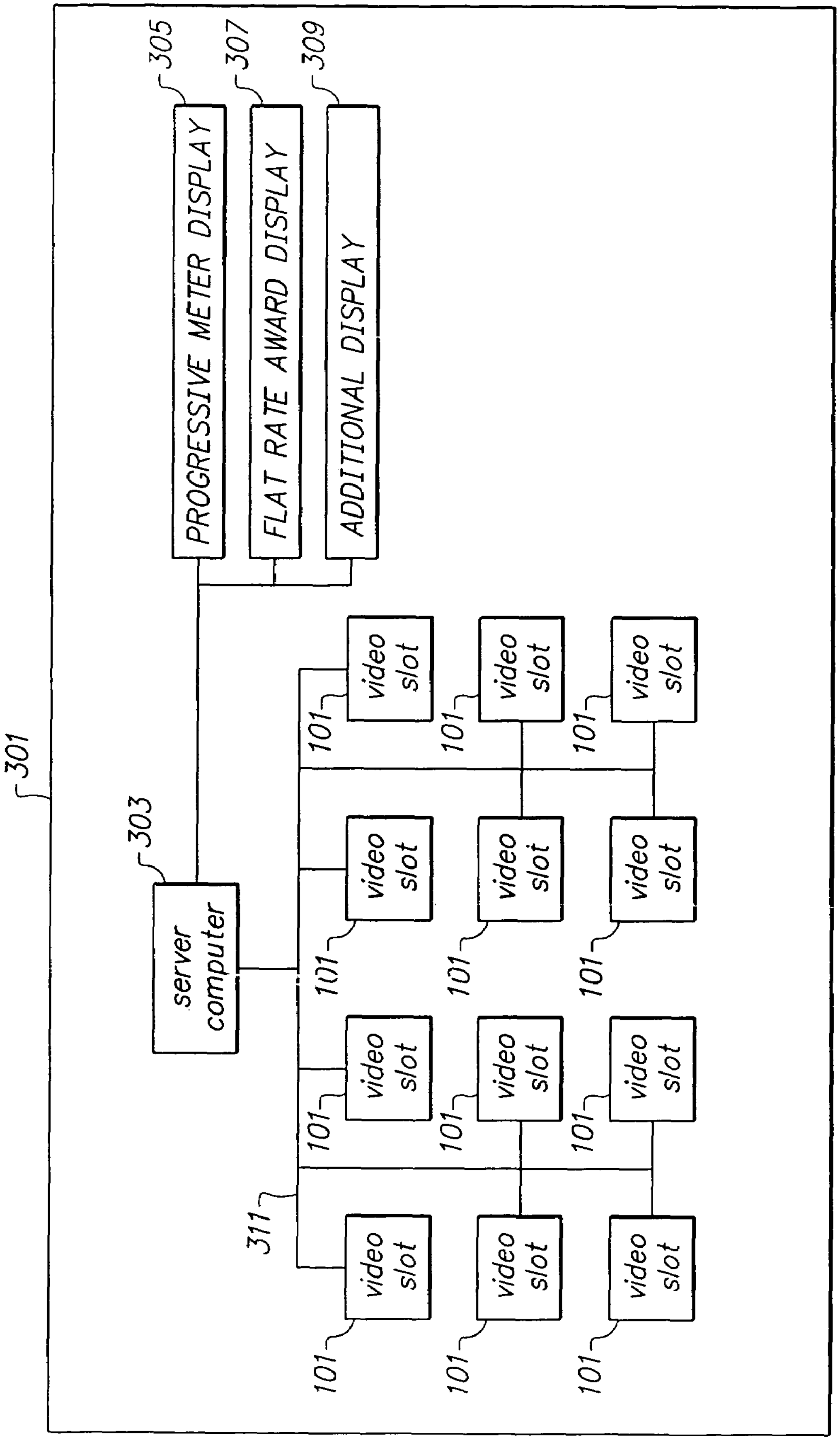
FIG. 3 is a block diagram of a local area network of computer-controlled slot machines, according to the present invention for progressive gaming activity.

Each computer-controlled slot machine 101 is preferably connected to a local area computer network as illustrated in FIG. 3. The local area computer network 301 is controlled by a microprocessor-controlled server computer 303 which controls game play, records game statistics, accounts for vouchers and jackpots, and links the games together. The local area computer network 301 also preferably includes a progressive meter display 305 for showing progressive jackpot information, a flat rate award display 307 for showing flat rate jackpot information, and an additional display 309 for showing the scores that presently qualify for jackpots on the local area network 301. In the preferred embodiment of the present invention, all of the computer-controlled slot machines 101 are connected to the local area computer network 301 in conventional manner via private dedicated lines 311. In an alternative embodiment, some or all of the computer-controlled slot machines 101 positioned at remote locations are connected to the local area computer network 301 via modems and public telephone lines operated in secure mode through encryption/decryption techniques.

Figure 4:
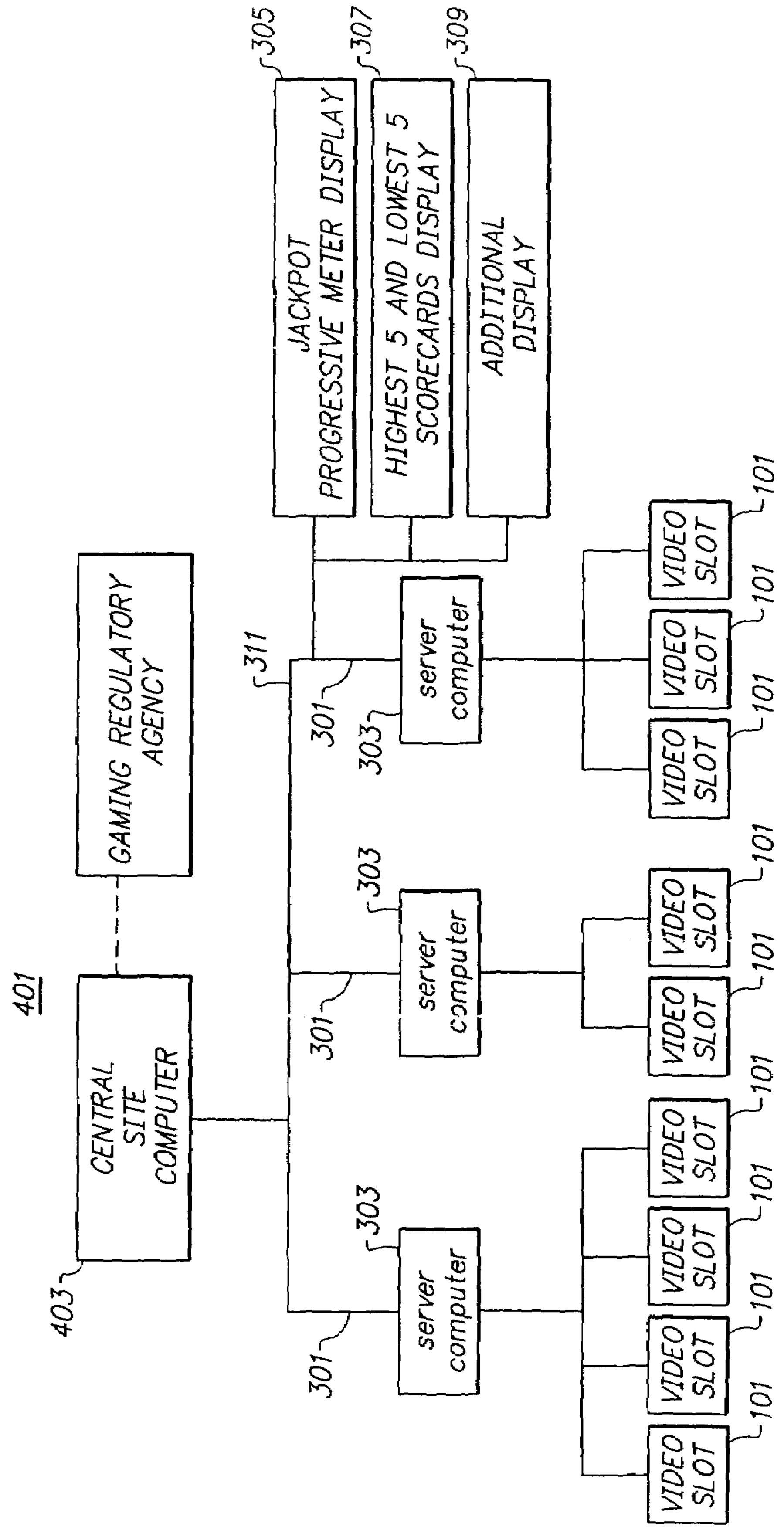
FIG. 4 is a block diagram of a wide area network of computer-controlled slot machines, according to the present invention for progressive gaming activity.

Each local area network 301 of computer-controlled slot machines 101 maybe connected to a wide area computer network as illustrated in FIG. 4. The wide area computer network 401 includes local area computer networks 301 at various physical locations. The wide area computer network 401 is controlled by a central-site computer 403 which operates in 24-hour-a-day communication with all local area computer networks 301 on the wide area computer network 401 for security, accounting, and verification of games and jackpots. If a local area computer network 301 is connected to a wide area computer network 401, the progressive meter display 305, the flat rate award display 307, and the additional display 309 of that local area computer network 301 all display jackpot and other information pertaining to the entire wide area network 401. For example, the additional display 309 of a local area computer network 301 which is connected to a wide area computer network 401 shows scores that presently qualify for jackpots on the wide area network 401. In the preferred embodiment of the present invention, each local area computer network 301 is connected to the wide area computer network 401 in conventional secured cryptographic manner via private dedicated lines 311. In an alternative embodiment, some or all of the local area computer networks 301 are connected to the wide area computer network 401 in secured cryptographic manner via modems and public telephone lines.

In a preferred embodiment of the present invention, the computer-controlled slot machine 101 includes a touch-sensitive display 115 for player input and game display. As described below, the display 115 may be configured to display a variety of information, and information in a variety of configurations or formats.

Figure 6:
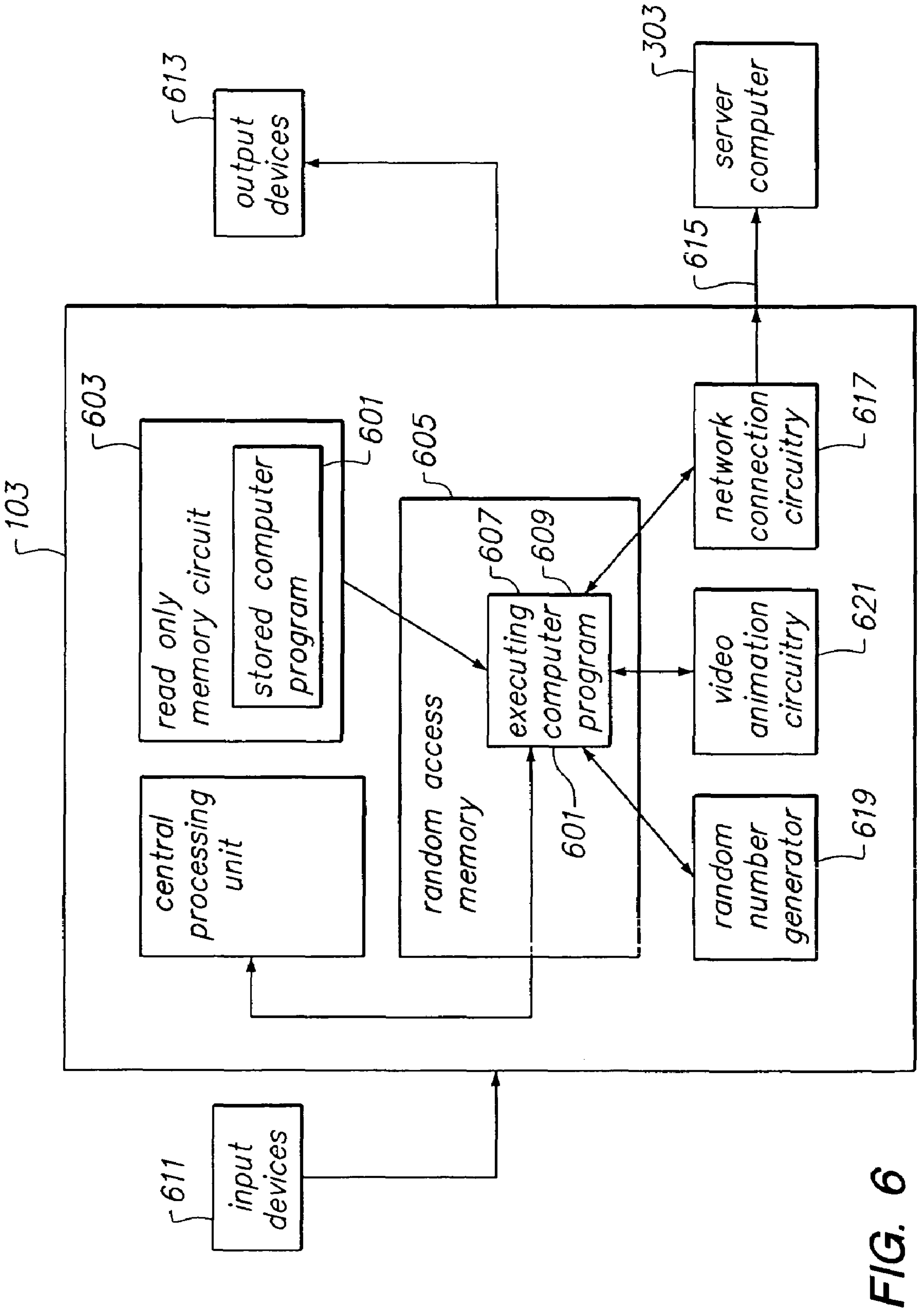
FIG. 6 is a block diagram of the microprocessor-controlled computer and the computer program which facilitate game play according to one embodiment of the present invention.

FIG. 6 illustrates an embodiment of a computer system that facilities game play. In a preferred embodiment of the present invention for playing the game of Check, game play is facilitated by a computer program 601 executing in the microprocessor-controlled computer 103 within the computer-controlled slot machine 101. In the preferred embodiment of the present invention, the computer program is stored on a read-only memory integrated circuit 603 that is operatively coupled to the microprocessor-controlled computer 103 in the computer-controlled slot machine 101. Of course, in alternative embodiments, the computer program may be stored on various other storage media, such as semiconductor memory or optical or magnetic disk, or the like.

The computer program 601 executes from the random access memory 605 of the microprocessor-controlled computer 103 in the computer-controlled slot machine 101, and includes code 607 and data 609 to facilitate the play of games or events of the invention.

The computer program accepts user input from various user input devices 611 of the types previously described, including coin acceptor 111, bill validator 113, the touch-sensitive display 115, and the machine-readable medium reading and writing device 129. Other input devices including mechanical button type switches and lever-arm switch actuators maybe used in alternative embodiments as desired.

The computer program also controls computer operation of the various output devices 613 such as the display 115, the sound speaker 117, a tower light 119, the meter 121, the coin hopper 123, the ticket printer 125, and the machine-readable medium reading and writing device 129.

Preferably, the computer program 601 also controls communication with the microprocessor-controlled server computer 303 which controls the local area computer network 301. The computer program 601 controls this communication via a network port 615 and network connectivity circuitry 617 contained within the microprocessor-controlled computer 103.

The computer program 601 utilizes a random number generator 619 to produce random numbers that represent the results of the outcome of games or events, such as, described below, the simulated rolling of the simulated dice 541. The computer program 601 utilizes animation circuitry 621 to produce the simulation of dice on the display 115.

Other systems and apparatus for implementing games or events of the invention are described in more detail below. It will be appreciated that a variety of systems maybe employed for such purposes.

A preferred embodiment of the invention comprises a gaming event. Preferably, the gaming event is a multi-player event. The event comprises the one or more players playing one or more games. The outcome of a player's play of the one or more games is utilized in the determination of the event as including the multiple players.

In one embodiment, players play one or more games for a score or value which may be used in comparison to the score or value of other players' play. The scores or values of the players are utilized to determine the outcome of the main event.

As one aspect of the invention, the player is playing two games at the same time: the base game(s) and the overall event. In one embodiment, the player is provided the opportunity for the award of winnings associated with not only the base game(s) but the overall event.

Several embodiments of games of the invention will now be described in more detail.

One game is referred to herein as "Check." This game may be implemented in a variety of ways, including on a variety of systems. One embodiment of the game will be described as implemented on a system such as that just described.

Figure 5A:
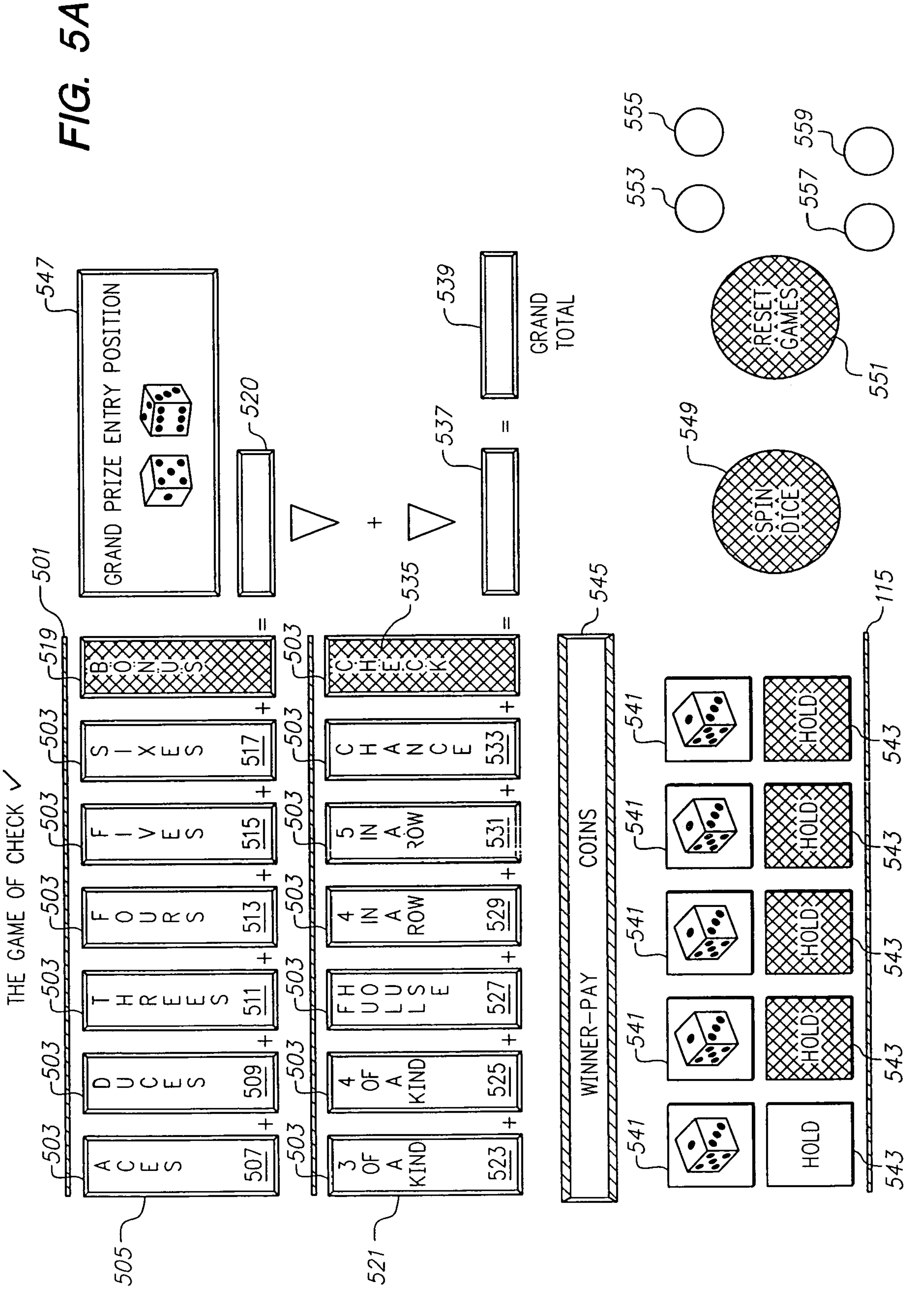
FIG. 5A is a diagram of a touch-sensitive display of a computer-controlled slot machine, in accordance with one embodiment of the gaming system of the present invention.

In this embodiment, FIG. 5A illustrates the layout of a touch-sensitive display. The touch-sensitive display 115 allows the player to make input selections conveniently, and displays game information in various ways, depending upon game state. The upper left area of the display 115 displays a scorecard 501 which includes thirteen dual purpose score areas 503 pertaining to the thirteen possible scoring categories. These areas are utilized to accept a player's selection of a scoring category after achieving a scoring spin, and also to display the score achieved by a player in that category, as detailed below with respect to game play.

The computer-controlled display scorecard 501 is divided into two portions. The upper portion 505 of the scorecard 501 includes dual purpose score areas 503 of the display for Ones (or Aces) 507, Twos (or Deuces) 509, Threes 511, Fours 513, Fives 515, and Sixes 517. If the player exceeds a pre-determined score threshold on the upper portion 505 of the scorecard 501, the player is awarded a bonus score which is displayed in the bonus score display area 519 of the upper portion 505 of the scorecard 501. The upper portion 505 of the scorecard 501 also includes an upper portion score total display area 520 for displaying the total of all of the scores achieved in the scoring categories of the upper portion 505 of the scorecard 501. A detailed explanation of scoring is provided below with respect to game play.

The lower portion 521 of the display scorecard 501 includes dual purpose score areas 503 for 3-of-a-Kind 523, 4-of-a-Kind 525, Full House 527, a four-dice Straight 529, a five-dice Straight 531, the sum of all five dice (or Chance) 533, and 5-of-a-Kind (or Check) 535. The lower portion 521 of the scorecard 501 also includes a lower portion score total display area 537 for displaying the total of all of the scores achieved in the scoring categories of the lower portion 521 of the scorecard 501.

The display 115 includes a grand total score display area 539 which displays a player's grand total score as the sum of the upper portion score total and the lower portion score total.

The bottom left area of the display 115 includes five simulated dice 541. The bottom left area of the display 115 includes five hold buttons 543 immediately below the simulated dice 541. These hold buttons 543 are touch-sensitive areas, and are for holding a specific simulated dice 541 on a series of spins (rolls) when the player is attempting to obtain a certain combination, as detailed below with respect to game play.

The middle left area of the display 115 includes a text message box 545 for informing players of games states, such as number of spins remaining, winning combinations, game over, and for informing players of the amount of payouts.

The upper right area of the display 115 includes a message area 547 showing the position of the current scorecard 501 in the daily, weekly, monthly, or yearly prize jackpot award among multiple player networks for the prevailing scores. Alternatively, the message area 547 may show the top five scores on a multiple-player network that qualify for a jackpot, as well as the bottom five scores that so qualify, so that the player can see scores required to achieve a jackpot, as detailed below with respect to jackpots.

The bottom right area of the touch-sensitive display 115 includes a number of touch-sensitive areas which facilitate configuration and control of the game of Check. Specifically, a touch-sensitive spin button 549 activates a spin (roll) of the simulated dice 541, a touch-sensitive reset button 551 resets the scorecard 501, and a touch-sensitive start game button 553 starts a game. A touch-sensitive wager button 555 allows a player to select the number of credits to wager, a touch-sensitive game mode selection button 557 allows a player to switch between game modes, and a touch-sensitive save-restore game button 559 allows a player to save or restore a game in progress to or from a card or voucher of machine-readable medium. Of course, the various buttons or control inputs, for example 543, 549, 551, 553, 555 and 557, described herein as touch-sensitive areas on the display, 115 may also be provided as mechanical electrical input devices, as desired.

Figure 5B:
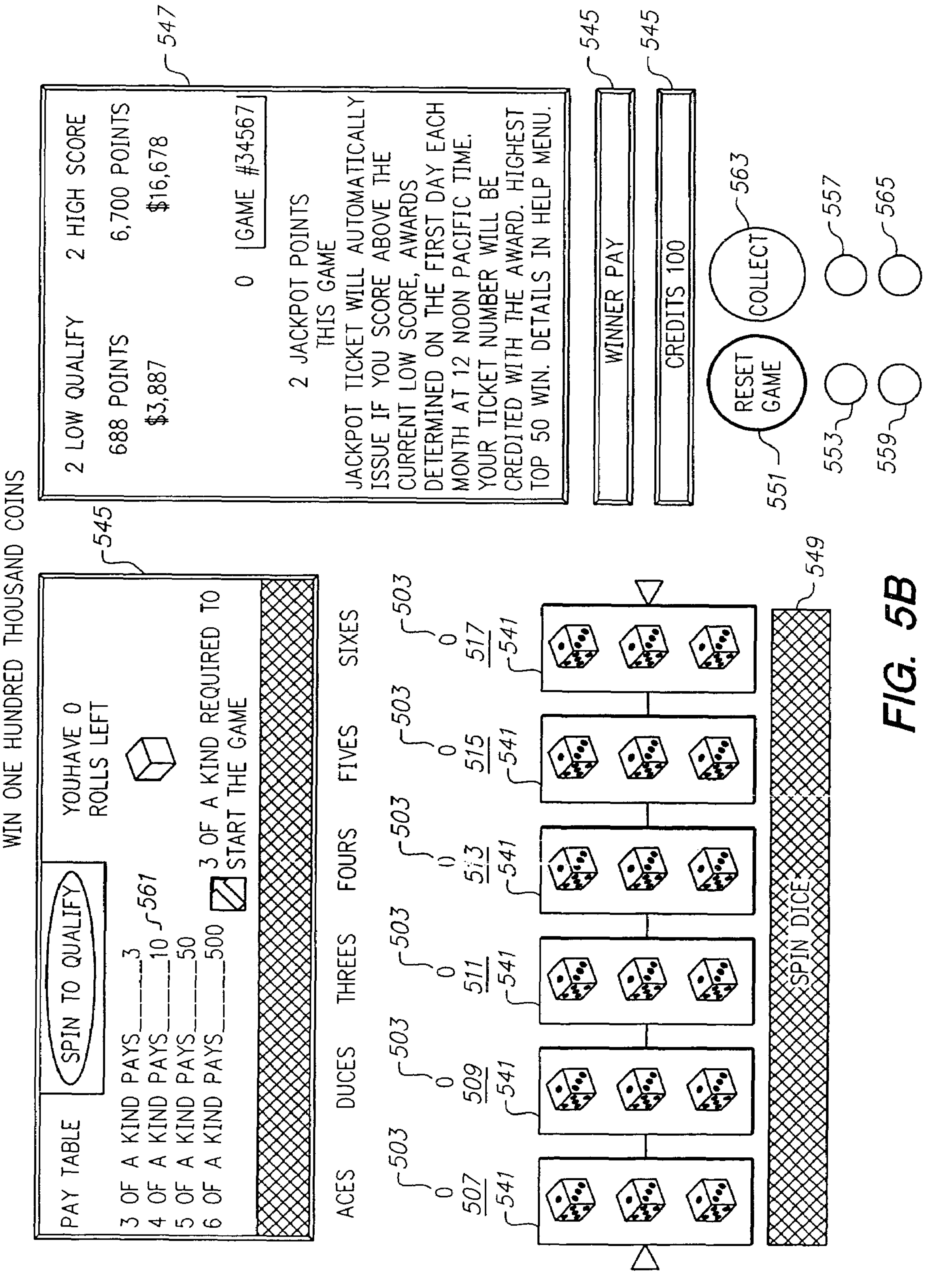
FIG. 5B is a diagram of a touch-sensitive display of a computer-controlled slot machine, in accordance with an alternative embodiment of the gaming system of the present invention.

FIG. 5B illustrates the layout of the touch-sensitive 115 display in accordance with an embodiment of the present invention for playing the game of Z Sixty Six. The touch-sensitive display 115 allows the player to make input selections conveniently, and displays game information in various ways, depending upon game state. The upper left area of the display 115 displays a paytable 561 which indicates predetermined amounts to be paid for achieving specific scoring combinations. The paytable 561 is updated as the game progresses to reflect predetermined amounts to be paid for achieving scoring combinations at different stages of game play.

Below the paytable 561 are six score areas 503 of the display 115. There is a score area for Ones (or Aces) 507, for Twos (or Deuces) 509, for Threes 511, for Fours 513, for Fives 515, and for Sixes 517. Scoring combinations are assigned to appropriate score areas 503. A detailed explanation of scoring is provided below with respect to game play.

The bottom left area of the display 115 includes six simulated dice 541. In the embodiment shown in FIG. 5B, the simulated dice are in the form of a video simulated dice reels. Below the video simulated dice 541 is a touch sensitive spin button 549 that activates a spin (roll) of the simulated dice 541. In the embodiment illustrated in FIG. 5B, the spin button 549 is in the form of one spin bar common to all simulated dice 541 on the display 115.

The upper central area of the display 115 includes a text message box 545 for informing players of games states, such as number of spins remaining, winning combinations, game over, and for informing players of the amount of payouts. The upper right area of the display 115 includes a message area 547 showing the top score on a multiple-player network that qualifies for a jackpot, as well as the bottom score that so qualifies, so that the player can see scores required to achieve a jackpot, as detailed below with respect to jackpots. Alternatively, the message area 547 may show the position of the current score in the daily, weekly, monthly, or yearly prize jackpot award among multiple player networks for the prevailing scores.

In the embodiment illustrated in FIG. 5B, a text message box 545 for informing players of payout amounts, and a text message box 545 for informing players of the number of accumulated credits are located below the message area 547.

The bottom right area of the touch-sensitive display 115 includes a number of touch-sensitive areas which facilitate configuration and control of the game of Z Sixty Six. A touch-sensitive reset button 551 resets the game, and a touch-sensitive start game button 553 starts a game. A touch-sensitive game mode selection button 557 allows a player to switch single and multiple-player game modes. A touch-sensitive save-restore game button 559 allows a player to save or restore a game in progress to or from a card or voucher of machine-readable medium. A touch-sensitive collect button 563 allows a player to collect accumulated winnings. In one embodiment, a touch-sensitive translate button 565 allows a player to select a language to be used for display output. Of course, the various buttons or control inputs, for example 551, 553, 557, and 559 described herein as touch-sensitive areas on the display 115, may also be provided as mechanical electrical input devices, as desired.

Figure 7:
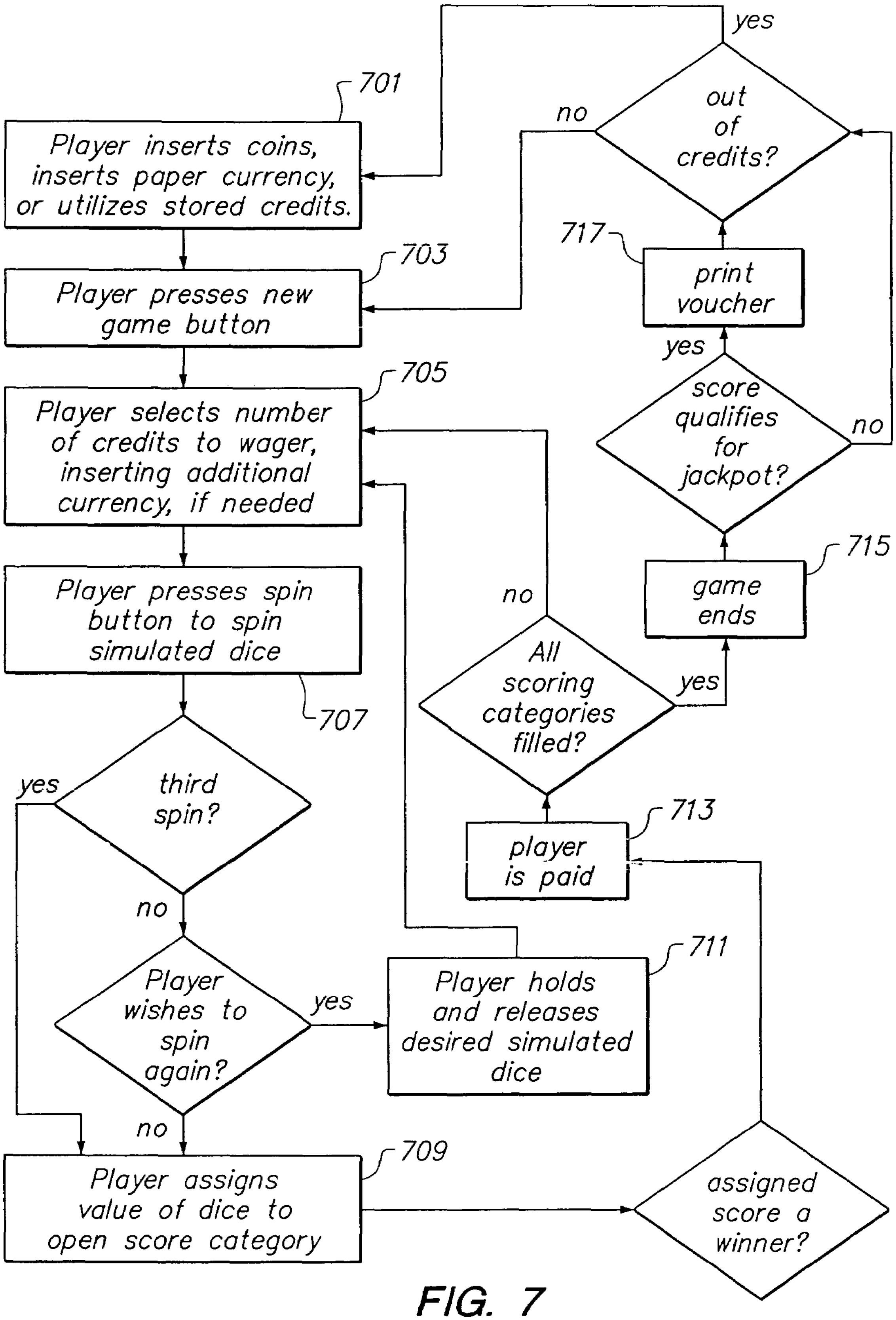
FIG. 7 is a flowchart illustrating the steps of game play according to one embodiment of the present invention.

FIG. 7 is a flowchart, illustrating play of the game of Check according to one embodiment of the present invention. The object of the game is to 'spin' the simulated dice 541 for scoring combinations, and to get the highest total score accumulated within scoring categories of possible dice combinations. A player begins by inserting 701 one or more coins into the coin acceptor 111, by inserting 701 one or more bills into the bill validator 113, or by utilizing credits. The player then presses 703 the touch-sensitive start game button 553 to begin game play. The player then selects 705 the number of credits to wager on the spin of the simulated dice 541 by utilizing the touch-sensitive wager button 555 which controls the selection of the number of credits to be wagered. The player next spins 707 the simulated dice 541 by pressing the touch-sensitive spin button 549. The computer program 601 utilizes the random number generator 619 to produce random numbers that represent the results of the simulated roll of the simulated dice 541.

On each turn, the player may spin 707 the simulated dice 541 up to three times in order to get the highest scoring combination for one of thirteen scoring categories. The thirteen scoring categories are illustrated by the following table:

| Upper Portion of Scorecard | How the Dice Score |
|---|---|
| One (or Aces) | Total of dice showing One only |
| Twos (or Deuces) | Total of dice showing Two only |
| Threes | Total of dice showing Three only |
| Fours | Total of dice showing Four only |
| Fives | Total of dice showing Five only |
| Sixes | Total of dice showing Six only |
| **Bottom Portion of Scorecard** | **How the Dice Score** |
| 3-of-a-Kind | Total of all five dice |
| 4-of-a-Kind | Total of all five dice |
| Full House (3 of one number, 2 of another number | 25 |
| Four-Dice Straight | 30 |
| Five-Dice Straight | 40 |
| 5-of-a-Kind (or a Check) | 50 |
| Chance (any five dice) | Total of all five dice |

After each spin the player may assign 709 the value of the simulated dice 541 to one of the possible scoring categories by utilizing the dual purpose score areas 503 of the touch-sensitive display 115. If a player does so, the computer under program control senses the touched areas 503 and totals the value of the simulated dice 541 and calculates and displays the resulting score in the dual purpose score area 503 on the touch-sensitive display 115. The total score of the upper portion 505 of the scorecard 501 is displayed on the upper portion score total display area 520 on the touch-sensitive display 115. If the total score of the upper portion 505 of the scorecard 501 is 63 or higher, for example, then a bonus of 35 points, for example, is added to the upper portion score. This bonus is displayed on the bonus score display area 519 on the display 115. The total score of the lower portion 521 of the scorecard 501 is displayed on the lower portion score total display area 537 on the display 115. The grand total score is calculated by adding the upper portion and the lower portion scores together. The grand total score is displayed on the grand total score display area 539 on the display 115.

Each scoring category can only be scored or selected once during a game. Once a category is used, it cannot be reused until the next game either when the game is over because the scorecard 501 is complete or the player presses the touch-sensitive reset button 551. Pressing the touch-sensitive reset button 551 clears the entire scorecard 501 in preparation for the start of a new game.

Instead, if the player has not yet spun 707 three times during the present turn, the player may elect not to assign 709 the value of the simulated dice 541, but instead to spin 707 again. If the player elects to spin 707 again, the player may hold 711 one or more of the simulated dice 541 by pressing one or more of the associated hold button(s) 543. The player may also release 711 one or more of any held simulated dice 541 by again pressing the associated hold button(s) 543. The player may also elect not to hold or release 711 any of the simulated dice 541. The player then selects 705 the number of credits to wager on the spin of the simulated dice 541 by utilizing the touch-sensitive wager button 555. The player next spins 707 the simulated dice 541 by pressing the touch-sensitive spin button 549.

A turn is over after a player has spun 707 three times, or has assigned 709 the value of the simulated dice 541 to one of the possible scoring categories by utilizing the dual purpose score areas 503 of the touch-sensitive display 115. After a player has spun 707 three times, the player must assign 709 the value of the simulated dice 541 to one of the possible scoring categories by utilizing the dual purpose score areas 503 of the touch-sensitive display 115. If the score cannot be placed into one of the categories because it does not correspond or qualify, then the player must utilize the dual purpose score areas 503 of the touch-sensitive display to assign 709 a zero to one of the remaining categories.

If the player has achieved a scoring combination and assigns 709 it to one of the scoring categories, the player is paid 713 via the coin hopper 123. Alternatively, the player may elect to receive credits. The computer program 601 calculates payment according to a paytable, which is based upon points scored per turn, and the number of spins needed to achieve the points, as shown, for example, in the following table:

| | NUMBER OF COINS | | |
|---|---|---|---|
| CATEGORY | ×3 Spin 1 | ×2 Spin 2 | ×1 Spin 3 |
| ONES | TOTAL × 3 | TOTAL × 2 | TOTAL OF 1's |
| TWOS | TOTAL × 3 | TOTAL × 2 | TOTAL OF 2's |
| THREES | TOTAL × 3 | TOTAL × 2 | TOTAL OF 3's |
| FOURS | TOTAL × 3 | TOTAL × 2 | TOTAL OF 4's |
| FIVES | TOTAL × 3 | TOTAL × 2 | TOTAL OF 5's |
| SIXES | TOTAL × 3 | TOTAL × 2 | TOTAL OF 6's |
| 3 of a Kind | TOTAL × 3 | TOTAL × 2 | TOTAL × 1 |
| 4 of a Kind | TOTAL × 3 | TOTAL × 2 | TOTAL × 1 |
| Full House | 75 | 50 | 25 |
| Small Straight | 90 | 60 | 30 |
| Large Straight | 120 | 80 | 40 |
| Chance | TOTAL × 3 | TOTAL × 2 | TOTAL × 1 |
| Check | 150 | 100 | 50 |
| Check Bonus 1 | 300 | 250 | 100 |
| Check Bonus 2 | 300 | 200 | 100 |
| Check Bonus 3 | 300 | 200 | 100 |

| SCORECARD BONUSES | |
|---|---|
| TOP HALF 63+ POINTS | +35 COINS |
| ALL CATEGORIES FILLED | +100 COINS |
| SCORE 250–299 PTS. | +50 COINS |
| SCORE 300–349 PTS. | +100 COINS |
| SCORE 350–399 PTS. | +150 COINS |
| SCORE 400–449 PTS. | +200 COINS |
| SCORE 450–499 PTS. | +250 COINS |
| SCORE 500–549 PTS. | +300 COINS |
| SCORE 550–599 PTS. | +350 COINS |
| SCORE 600–644 PTS. | +400 COINS |
| PERFECT SCORE | +6000 COINS |

If the player assigns 709 a zero score to one of the categories, the player is not paid. Alternative embodiments may employ different paytables, as desired.

The player may then proceed with the next turn and continue filling the scorecard 501. To proceed with the next turn the player utilizes the touch-sensitive wager button 555 to select 705 the number of credits to be wagered on the spin of the simulated dice. The player next spins 707 the simulated dice 541 by pressing the touch-sensitive spin button 549 and plays a turn, as described above. The game ends 715 when the player has filled all thirteen categories with a score or a zero or is out of credits to play the computer-controlled slot machine 101.

In a preferred embodiment, the game of Check is played as part of a main event. In accordance with the main event, multiple players play the game of Check one or more times for a score as described above. The players' scores are then used determined the outcome of the event. Additional details of such an events are described in more detail below.

Consistent with that latter disclosure, in one embodiment, once the game has ended, the computer program 601 evaluates the player's scorecard 501 against other current scores to determine if a progressive jackpot will be awarded on a daily, weekly, monthly, or yearly basis. If the player has a currently qualifying scorecard 501, the computer-controlled slot machine 101 prints 717 a voucher for the player with a control number and other pertinent information for later redemption, if the scorecard 501 is a winner.

Utilizing a local area computer network 301 and a wide area computer network 401, multiple players may play the game of Check against one another instead of "against the house." Utilizing a local area computer network 301, each participating player deposits money into an individual computer-controlled slot machine 101 for each spin. The player who achieves the highest scorecard 501 of all of the players who are participating in that multiple player game on the local area computer network 301 wins the money deposited by the various participating players (typically, minus a percentage for the house). The same methodology can be utilized across a wide area computer network 401, allowing players at different physical locations to compete against each other in real time.

Figure 8:
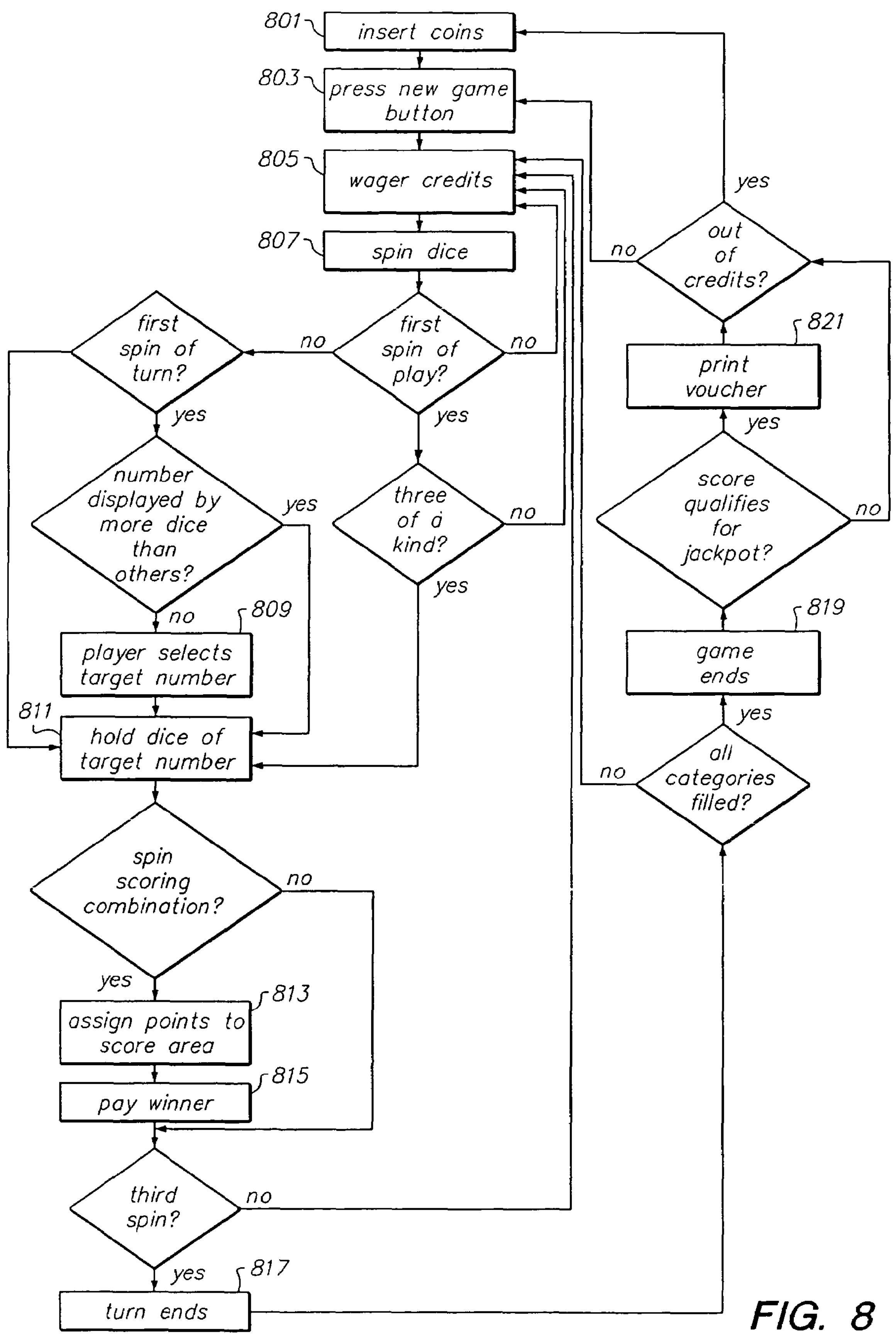
FIG. 8 is a flowchart illustrating the steps of game play according to an alternative embodiment of the present invention.

FIG. 8 is a flowchart, illustrating play of another game of the invention, referred to herein as "Z Sixty Six." The object of the game is to 'spin' the simulated dice 541 for scoring combinations, and to get the highest total score accumulated within scoring categories of possible dice combinations. A player begins by inserting 801 one or more coins into the coin acceptor 111, by inserting 801 one or more bills into the bill validator 113, or by utilizing credits. The player then presses 803 the touch-sensitive start game button 553 to begin game play. In one embodiment, three credits are automatically wagered 805 on each spin of the simulated dice 541. In another embodiment, the player selects the number of credits to wager on the spin of the simulated dice 541 by utilizing the touch-sensitive wager button 555 which controls the selection of the number of credits to be wagered. The player next spins 807 the simulated dice 541 by pressing the touch-sensitive spin button 549. The computer program 601 utilizes the random number generator 619 to produce random numbers that represent the results of the simulated roll of the simulated dice 541.

The player must achieve at least three of a kind on a single spin to begin play of an individual game. Until a spin generates at least three simulated dice 541 displaying identical numbers, the player must continue spinning 807 to attempt to generate the minimum achievement required for game entry. A wager is required for each spin of the simulated dice 541. Once a spin generates at least three simulated dice 541 displaying identical numbers, those simulated dice 541 are automatically held 811, and a predetermined number of points is automatically assigned 813 to the appropriate scoring area 503. The number of points awarded is displayed in the appropriate score area 503, which preferably changes color to indicate active status. The spin that generated the requisite achievement is counted as the first spin of a turn, and the scoring number becomes a target number for the remainder of the turn. A target number is a number that the player can receive points for generating during a given turn.

For example, if a first spin results in four aces (ones), the predetermined number of points for achieving four of a kind on the first spin of a first turn is automatically assigned 813 to the scoring area 503 for aces 507. Aces becomes the target number for the remainder of the turn. Thus, on the subsequent spins of the turn, the player will receive additional points only for generating aces.

The requirement of generating at least three of a kind preferably applies only to the first turn. A player must achieve three of a kind to enter the game and begin the first turn. Once a player has generated the requisite achievement and entered the game, subsequent turns do not require a minimum achievement to begin.

On each turn, the player may spin 807 the simulated dice 541 up to three times in order to get the highest scoring combination for one of six scoring categories. The six scoring categories are illustrated by the following table:

| Score Category | How the Dice Score |
|---|---|
| One (or Aces) | Dice showing One only |
| Twos ( or Deuces) | Dice showing Two only |
| Threes | Dice showing Three only |
| Fours | Dice showing Four only |
| Fives | Dice showing Five only |
| Sixes | Dice showing Six only |

After the first spin of a turn, the number displayed by the largest plurality of the video simulated dice 541 automatically becomes the target number for the current turn. The simulated dice 541 of the target number are automatically held 811, and the score area 503 for the target number preferably changes color to indicate that it is the active score area 503 for the turn. If at least three dice 541 displaying the target number have been generated, a predetermined number of points is assigned 813 to the score area 503 for the target number.

If the first spin does not result in a largest plurality of dice 541 displaying any one number, the player selects 809 a target number from amongst those displayed by an equal number of the simulated dice 541. For example, if the first spin results in two aces, two deuces, one four and one five, the player may select 809 acres or deuces as the target number. The selection is made by touching the desired score area 503 of the touch-sensitive display 115. Preferably, the score areas 503 which the player may touch to choose a target number blink or change color or size or otherwise provide visual indication of the choices available.

If the player has not yet spun 807 three times during the present turn, the player may spin 807 again. The player next spins 807 the simulated dice 541 by pressing the touch-sensitive spin button 549. During the second and third spins of a turn, any generated dice 541 displaying the target number are held 811. Preselected numbers of points are assigned 813 to the appropriate scoring area 503 for scoring three, four, five, or six of the target number.

After each spin, if the player has achieved a scoring combination, the player is paid 815 via the coin hopper 123. Alternatively, the player may elect to receive credits. The number of predetermined points awarded for various scoring achievements is displayed in a paytable 545 on the display 115. The paytable 545 is adjusted as the game progress, reflecting predetermined numbers of points to be paid for various achievements at a particular stage of the game. For example, more points are awarded for achieving a six of a kind on a first spin than on a third spin. Amounts to be paid are based upon the odds of achieving various scoring combinations at a given stage of game play, taking into account number of unheld dice to be spun, and numbers removed from possible generation. An example of paytable 545 for a first spin of a game appears below.

| ACHIEVEMENT | NUMBER OF POINTS TO BE PAID |
|---|---|
| THREE OF A KIND | 3 |
| FOUR OF A KIND | 10 |
| FIVE OF A KIND | 50 |
| SIX OF A KIND | 500 |

Alternative embodiments may employ different paytables 545, as desired. A turn ends 817 after a player has spun 807 three times, or achieved six of the target number prior to the third spin.

Each scoring category can only be scored or selected once during a game. Once a category is used, it cannot be reused until the next game either when the game is over because a score has been assigned to each category, or the player presses the touch-sensitive reset button 551. Pressing the touch-sensitive reset button 551 terminates the current game and starts a new game. Once a scoring category for a given number has been used, that number is replaced for the remainder of the game by a non-numerical symbol, for example the letter "Z" or a graphic symbol of a piece of fruit, or as desired. During subsequent turns, when the random number generator 619 generates the used number, the non-numerical symbol is displayed instead.

After completing a turn, the player may then proceed with the next turn and continue filling the score areas 503. To proceed with the next turn, the player next spins 707 the simulated dice 541 by pressing the touch-sensitive spin button 549 and plays a turn, as described above.

The game ends 819 when the player has filled all six score areas 503 with a score, or is out of credits to play the computer-controlled slot machine 101.

Figure 9:
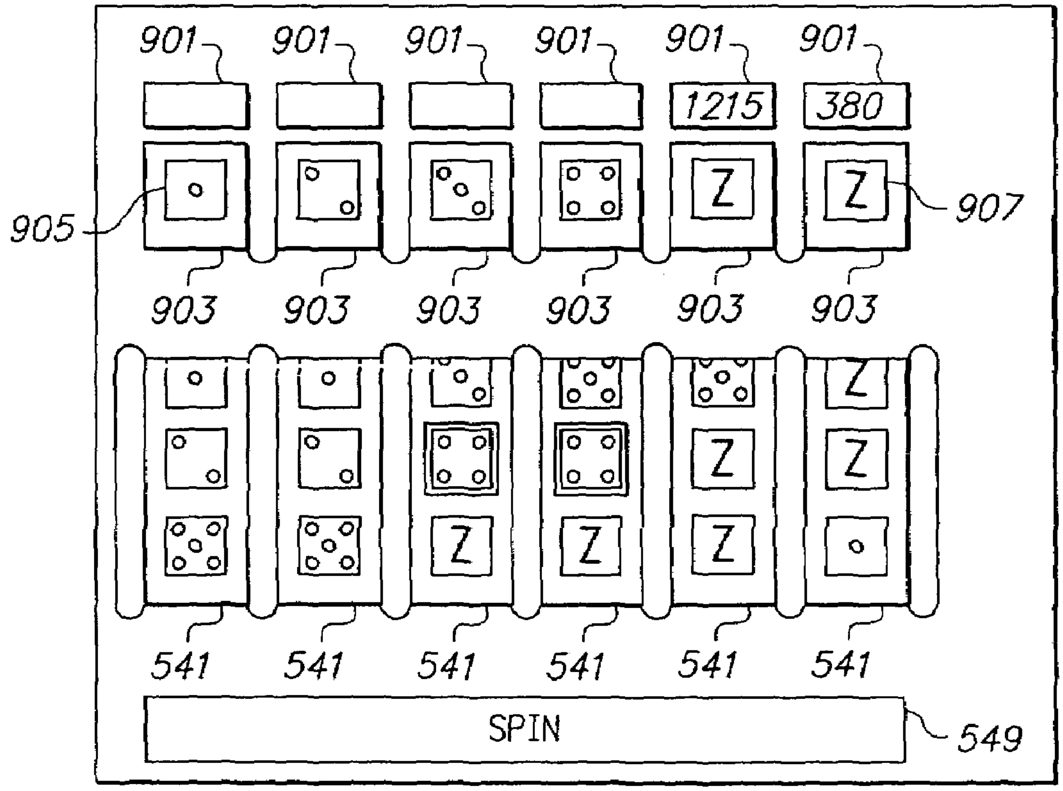
FIG. 9 is illustrates score categories comprising two distinct display areas, according to one embodiment of the present invention.

FIG. 9 illustrates an embodiment of the present invention in which each score area 503 comprises two distinct display areas. A first display area 901 is utilized to display accumulation of points for the associated scoring category. A second display area 903 identifies the associated scoring category, for example by displaying video simulated dice 905 displaying the number of the scoring category. Additionally, the second display area 903 is used to indicate a current target number for a turn, preferably by changing color to indicate that the number of the associated scoring category is the active target number. Also, the second display area 903 is preferably utilized to choose a target number from amongst those displayed by an equal number of the simulated dice 541 when necessary. The player chooses a target number by touching the second display areas 903 associated with the chosen target number. The second display area 903 which the player may touch to choose a target number blink or change color or size or otherwise provide visual indication of the choices available. Additionally, once a scoring category for a given number has been filled, the indicator for the associated second display area is replaced for the remainder of the game by a non-numerical symbol 907, for example the letter "Z" or a graphic symbol of a piece of fruit, or as desired.

In alternative embodiments, display of accumulated points, identification of score category, indication of current target number, indication of available choices of target number, and indication of filled categories (and in other embodiments more or fewer functions as desire) are divided between at least two display areas, in various combinations as desired.

Once the game has ended, the computer program 601 evaluates the player's score against other current scores to determine if a progressive jackpot will be awarded on a daily, weekly, monthly, or yearly basis. If the player has a currently qualifying score, the computer-controlled slot machine 101 prints 821 a voucher for the player with a control number and other pertinent information for later redemption, if the score is a winner. In various embodiments, jackpots are awarded for achieving high scores, for achieving high scores low scores, or for achieving both high and low scores as desired.

Figure 10:
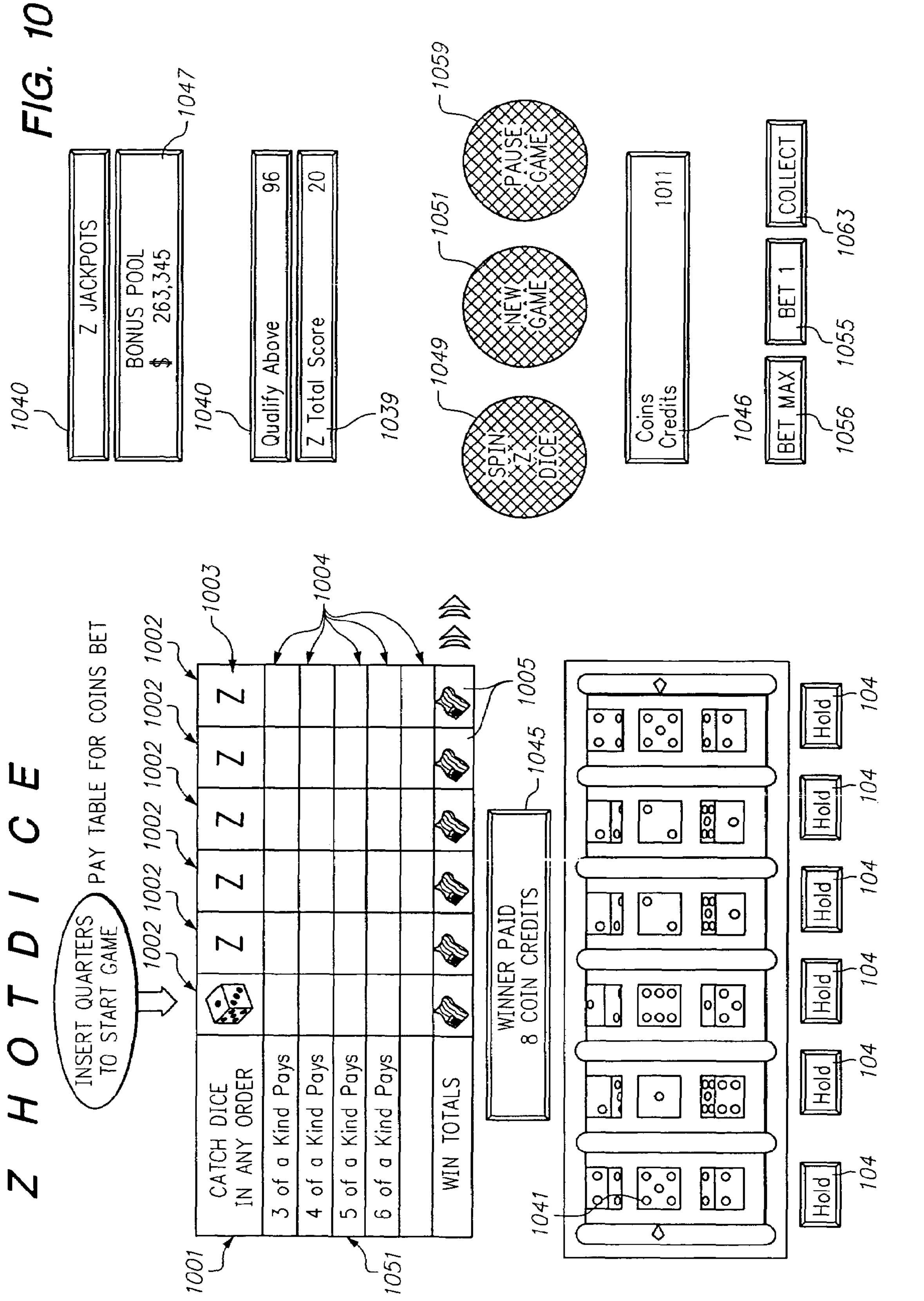
FIG. 10 illustrates a user-interface for an alternate game of the present invention.
Figure 11:
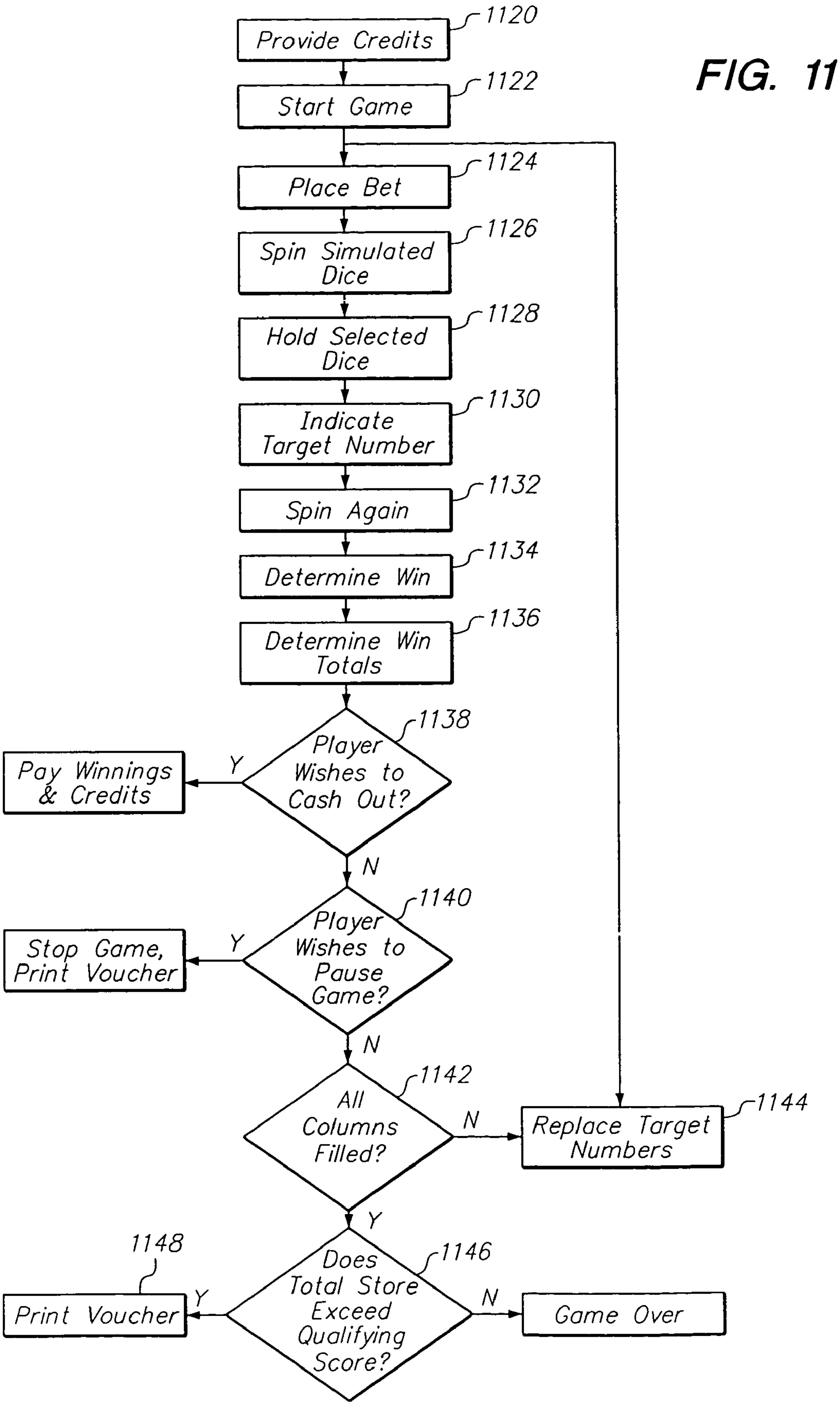
FIG. 11 is a flowchart illustrating the steps of game play of the game having the interface illustrated in FIG. 10.

Another embodiment of a game of the present invention will be described with reference primarily to FIGS. 10-11. This game is referred to herein as the game of Z Hot Dice. FIG. 10 illustrates a touch sensitive display 1015 for implementing the game of Z Hot Dice. A scorecard 1001 area is provided in an upper left-hand corner. The scorecard 1001 displays information regarding a particular event, the pay table for that event, prior played events, and win totals for each prior played event and the current event.

The scorecard 1001 includes six columns 1002, the number of columns being the same as the number of sides of dice. During game play, as described below, a target number is associated with one of the columns 1002, the target numbers comprising one of the numbers associated with a side of a dice (i.e. the numbers one through six). At a top of each column 1002 is provided a target number indicator 1003. In one embodiment, before a target number has been selected, this indicator 1003 displays a "Z" or other symbol (or nothing). A central portion 1004 of each column 1002 indicates the payout which will be awarded to a player for receiving a particular combination of the target number(s).

In the embodiment illustrated, the central portion 1004 is arranged to display payouts for receiving 3 of a Kind, 4 of a Kind, 5 of a Kind or Six of a Kind of the target number. A win total 1005 is provided at the bottom of each column 1002 for indicating the total payout or winnings to the player for a particular event. Those of skill in the art will appreciate that other winning combinations may be provided, such as a full house (i.e. three of the target number along with two of another number).

The display 1015 displays a number of simulated dice 1041, in a similar manner to that described above. Below each simulated dice area 1041 is a hold button 1043. Each button 1043 is associated with one of the simulated dice 1041 and, as described in more detail below, arranged to permit a player to "hold" the particular simulated dice 1041 in a fixed position.

A number of other display areas are provided for displaying game information. For example, a message area 1047 is provided for displaying the amount of winnings in a jackpot pool. A grand total area 1039 is provided for indicating to the player their total score for the win totals 1005 of all columns 1002. In addition, a qualify score 1040 is displayed so that the player may determine if his or her grant total is sufficiently high to qualify for a bonus or jackpot (as described below).

A new game button 1051 is provided for permitting a player to begin a new game. As described in more detail below, once a player has placed a wager, a text messages area 1045 displays winnings paid or other information for a player. The player may bet or wager credits in single increments with a "Bet 1" button 1055, or may bet or wager a maximum allowed number of credits using a "Bet Max" button 1056. A credits area 1046 displays the credits belonging to the player.

A spin button 1049 is provided for permitting a player to effectuate a spin of the simulated dice 1041. A pause game button 1059 is provided for permitting a player to pause a game in progress. A player may elect to cash out by pressing a collect button 1063.

As described in more detail below, while in one arrangement the user interface or screen comprises a touch screen arranged to display information to a player and receive input therefrom, the user interface may comprise a combination of electrical and mechanical devices. For example, one or more of the buttons may comprise electromechanical buttons which may be depressed by a player. Those of skill in the art will appreciate that many players like the "tactile" feel of buttons as compared to touch screen input. Further, while the display areas are discussed separately, they may be integrated or be arranged in a number of ways other than as shown.

A method of play of the game of Z Hot Dice will be described with reference to FIG. 11. In a first step 1120, a player inserts a number of coins or provides other consideration for playing the game. The consideration may be dollar bills, credits from a player card or the like.

In a step 1122, the player presses the new game button 1051 to initiate a new game. In one or more embodiments, the gaming apparatus is configured such that if the player presses the new game at any time during the pendency of a game, the player is prompted to press the new game button again if the player actually intends to start a new game. This serves to reduce the likelihood that the player may accidentally or unintentionally press the new game button 1051 and cause a new game to begin. The prompt message may be illuminated in the text message box 1045.

In a step 1124, the player places a wager or bet. In one embodiment, this step comprises the player pressing the "Bet 1" button 1055 or the "Bet Max" button 1056. In one embodiment, a player is permitted to bet between one and five credits. Each credit may comprise any of a number of values, such as $0.05 U.S., $0.10 U.S., $0.25 U.S. or the like. The player may utilize the "Bet 1" button 1055 to place wagers incrementally, or press the "Bet Max" button 1056 to place a maximum bet. The payouts displayed on the central portions 1004 of the columns 1002 maybe updated, as necessary, to reflect an increased payout for achieving a predetermined winning combination when the player increases the amount wagered.

In a step 1126 the player presses the spin button 1049. Upon depressing the spin button 1049, the simulated dice 1041 spin or move (such as in a motion simulating a "reel" displaying die faces), and then stop, as described above to simulate the random roll of dice.

At this point, six simulated die 1041 are displayed to the player, each dice 1041 displaying one face, and thus one number, towards the player. In the arrangement illustrated in FIG. 10, the simulated die 1041 display a five, a one, a six, a two, another two, and another five.

In a step 1128, the player is then permitted to "hold" the dice which that player wishes to play. The held dice identify a selected target number, the target number being that number shown on the face of the held dice. For example, in the arrangement illustrated in FIG. 10, the player may elect to hold the simulated die 1041 displaying fives. In such event, the player presses the right-most and left-most buttons 1043, and the target number then comprises five.

In a step 1130, when the player makes a selection, the target number is displayed in the first available column 1002 of the scorecard 1001. In one embodiment, the first available column comprises the left-most column 1002 which has not been utilized during the game. Preferably, the target number is illustrated by replacing the "Z" or other symbol in the indicator 1003 with a dice displaying the target number. In the example given above, a dice displaying a five would be displayed in the left-most column 1002.

In one or more embodiments, a player is not permitted to select as a target number a number which has already been played in a particular game. If the player attempts to do so, a message may be displayed in the text message box 1045 to the effect that the selected number has already been played and the player must either select a new target number of spin again. Another spin may be required where the first spin does not result in the display of any available target numbers (as described below, after a target number has been played, it is preferably removed from the simulated die 1041 and will not be re-displayed). In addition, if the player selects more than one number (such as a simulated dice 1041 displaying a five and another displaying a two) the player be instructed that the action is not permitted and the player must select only one target number.

Preferably, when a number is selected, the particular column 1002 is highlighted, such as in brightness or a different color, to aid the user in identifying which information is pertinent to the present round of the game.

In one or more embodiments, the particular payout is dependent upon the player's wager, with the payout increasing with an increasing wager. Set forth below are possible paytables for wagers of one, two, three, four and five coins or bet increments for each target number. As will be appreciated, the payout increases as the number of target numbers played increases (for reasons described below). Of course, a variety of payouts may be different than those illustrated.

For 1 coin bet:

| | First Target Number | Second Target Number | Third Target Number | Fourth Target Number | Fifth Target Number | Sixth Target Number |
|---|---|---|---|---|---|---|
| 3 of a Kind | 1 | 2 | 3 | 4 | 5 | 6 |
| 4 of a Kind | 3 | 4 | 5 | 8 | 11 | 33 |
| 5 of a Kind | 30 | 40 | 50 | 80 | 110 | 330 |
| 6 of a Kind | 300 | 400 | 500 | 800 | 1100 | 3300 |

For 2 coins bet:

| | First Target Number | Second Target Number | Third Target Number | Fourth Target Number | Fifth Target Number | Sixth Target Number |
|---|---|---|---|---|---|---|
| 3 of a Kind | 2 | 4 | 6 | 8 | 10 | 12 |
| 4 of a Kind | 6 | 8 | 10 | 16 | 22 | 66 |
| 5 of a Kind | 60 | 80 | 100 | 160 | 220 | 660 |
| 6 of a Kind | 600 | 800 | 1000 | 1600 | 2200 | 6600 |

For 3 coins bet:

| | First Target Number | Second Target Number | Third Target Number | Fourth Target Number | Fifth Target Number | Sixth Target Number |
|---|---|---|---|---|---|---|
| 3 of a Kind | 3 | 6 | 9 | 12 | 15 | 18 |
| 4 of a Kind | 9 | 12 | 15 | 24 | 33 | 99 |
| 5 of a Kind | 90 | 120 | 150 | 240 | 330 | 990 |
| 6 of a Kind | 900 | 1200 | 1500 | 2400 | 3300 | 9900 |

For 4 coins bet:

| | First Target Number | Second Target Number | Third Target Number | Fourth Target Number | Fifth Target Number | Sixth Target Number |
|---|---|---|---|---|---|---|
| 3 of a Kind | 4 | 8 | 12 | 16 | 20 | 24 |
| 4 of a Kind | 12 | 16 | 20 | 32 | 44 | 132 |
| 5 of a Kind | 120 | 160 | 200 | 320 | 440 | 1320 |
| 6 of a Kind | 1200 | 1600 | 2000 | 3200 | 4400 | 13200 |

For 5 coins bet:

| | First Target Number | Second Target Number | Third Target Number | Fourth Target Number | Fifth Target Number | Sixth Target Number |
|---|---|---|---|---|---|---|
| 3 of a Kind | 1 | 10 | 15 | 20 | 25 | 30 |
| 4 of a Kind | 15 | 20 | 25 | 40 | 55 | 165 |
| 5 of a Kind | 150 | 200 | 250 | 400 | 550 | 1650 |
| 6 of a Kind | 1500 | 2000 | 2500 | 4000 | 5500 | 16500 |

If after the first spin and hold, the player has a winning combination of simulated dice 1041, then the win total is indicated in the win total area 1005 of the scorecard 1001, and the text message box 1045 may indicate the winnings. For example, in the event upon the first spin of the game the spin results in four simulated dice 1041 showing a five, then the player may hold these four simulated dice for a "4 of a Kind" of a target number of fives. The payout for this combination may then be indicated in the win total area for the first column 1002, and the text message box 1045 indicate the winnings to be paid.

In one embodiment, payouts for combinations of target numbers which are eliminated may be removed from the scorecard 1001. For example, in the above-referenced example, the payout for a 3 of a Kind may be removed from the first column 1002, since the player has already received at least a 4 of a Kind. In addition, the payout which the player has already received upon the first spin for that target number may be highlighted to bring to the attention of the player that he or she has already won. This highlighting maybe by displaying the payout in a distinguishing color or brightness or other means available. The word "paid" may be indicated in the particular area of the scorecard 1001 as well.

In accordance with the present invention, in a step 1132, after holding one or more of the simulated dice 1041, or after an indication that no dice can be held, then the player presses the spin button 1049 again. All of the simulated dice 1041 which were not held spin and then stop, again displaying a number.

In a step 1134, the total number of simulated dice 1041 displaying the target number after the second spin are then counted for determining whether a payout is to be awarded. A win total is displayed in the win total area 1005 of the particular column. This win total maybe 0, in the event the player did not receive a sufficiently high number of simulated dice 1041 displaying the target number (for example, a player may elect to hold two dice showing the target number after the first spin and not receive any additional dice showing the target number after the second spin, thus not receiving a minimum three of the target number for an award). The payout for that "round" may then be updated in the text message box 1045.

In a step 1136, the win totals from all win total areas 1005 are summed and displayed as a total score in the total score area 1039. Preferably, a qualifying score for a jackpot bonus is displayed in the qualifying score area 1040, again which the player may compare their score.

In a step 1138 it is determined if the player wishes to cash out. This is indicated by a player pressing the collect button 963. In such event, any accumulated winnings and credits are paid to the player. In that event, the game ends.

In a step 1140, it is determined if the player wishes to pause the game. If the player wishes to pause the game, the player pushes the pause game button 1059. A process is then initiated by which the player may leave the game and being play at a later time and even at different gaming machine, as described in more detail below.

If the player wishes to continue the game, it is determined in a step 1142 if all of the columns 1002 of the scorecard 1001 are filled. If so, then the player has completed the game. In a step 1146, the player's total score is compared to the qualifying score to determine if the player qualifies for participation in the jackpot. If the player qualifies, then in a step 1148, the player is provided with a voucher or the like, in similar manner to that described above with respect to the game of Z Sixty Six.

In a step 1144, after a particular target number has been played in a round, that target number is replaced on each simulated dice 1041 with another symbol, is removed or is darkened. As described above, this may be a symbol, such as a "Z," or a picture of a fruit or the like. In one embodiment, it is preferred that the replacement symbols be different so that at no time can a player receive a sequence of the same symbols during a spin. Such maybe confusing to a player and lead a player into believing that they have spun into a winning combination. For example, the replacement symbols may comprise an X on the first simulated dice 1041, an O on the second simulated dice 1041, an X on the third simulated dice 1041 and so on, so that if a player spins and the simulated dice stop on the replacement symbols, they display XOXOX.

In another embodiment, the replacement symbols may actually be arranged so that a player may spin into a new bonus combination for which a payout is awarded. For example, each number or dice face may be replaced with a $ symbol, such that during later play if the player receives a display of all of these symbols after a spin, the player is awarded a special prize or payout.

If all of the columns 1002 of the scorecard 1001 are not filled, the player may, repeating again to step 1124, place a bet or wager. The player may be provided with an indication in the text message box 945 after a given round that they may place a bet to continue with the game.

The game then continues as described above. It will be appreciated that after a first target number has been played, a spin of the simulated dice 1041 may result in a display of all of the remaining numbers and/or the symbols used to replace the already played target number. As the number of played numbers increases, the probability of receiving a target number decreases. For this reason, as detailed above, the payout for receiving a winning combination of each target number increases as the game progresses.

The player may continue playing until each of the target numbers one through six, have been played (in any order). At such time, the total score for the player is compared to the qualifying score to determine if the player is entitled to participate in a jackpot or additional play. Regardless of the outcome, the player must then begin a new game to continue play.

Another embodiment of a game of the present invention will be described with reference primarily to FIGS. 12-13. This game is referred to herein as the game of Z Jackpot Dice.

Figure 12:
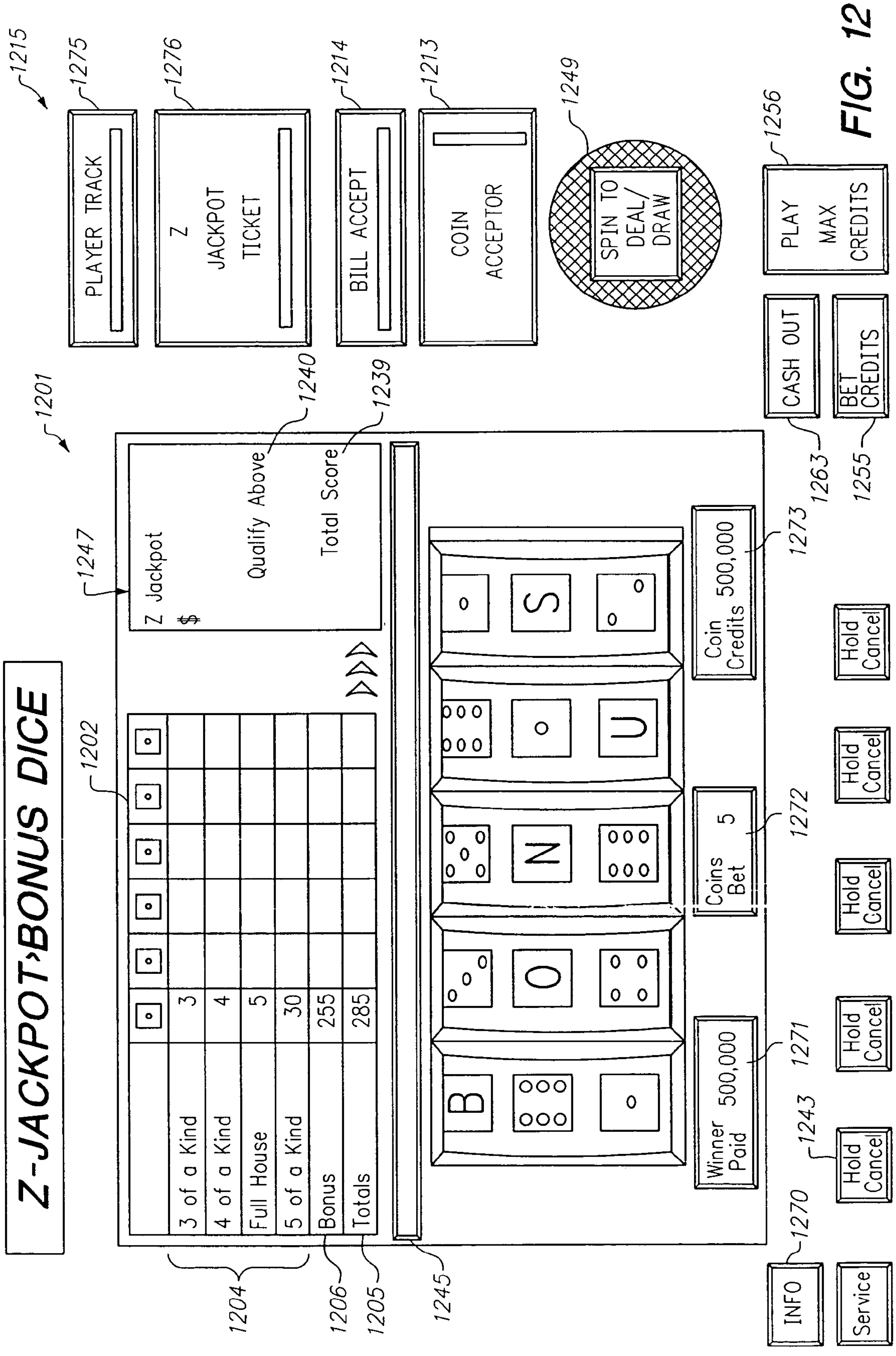
FIG. 12 illustrates a user-interface for an alternate game of the present invention.
Figure 13:
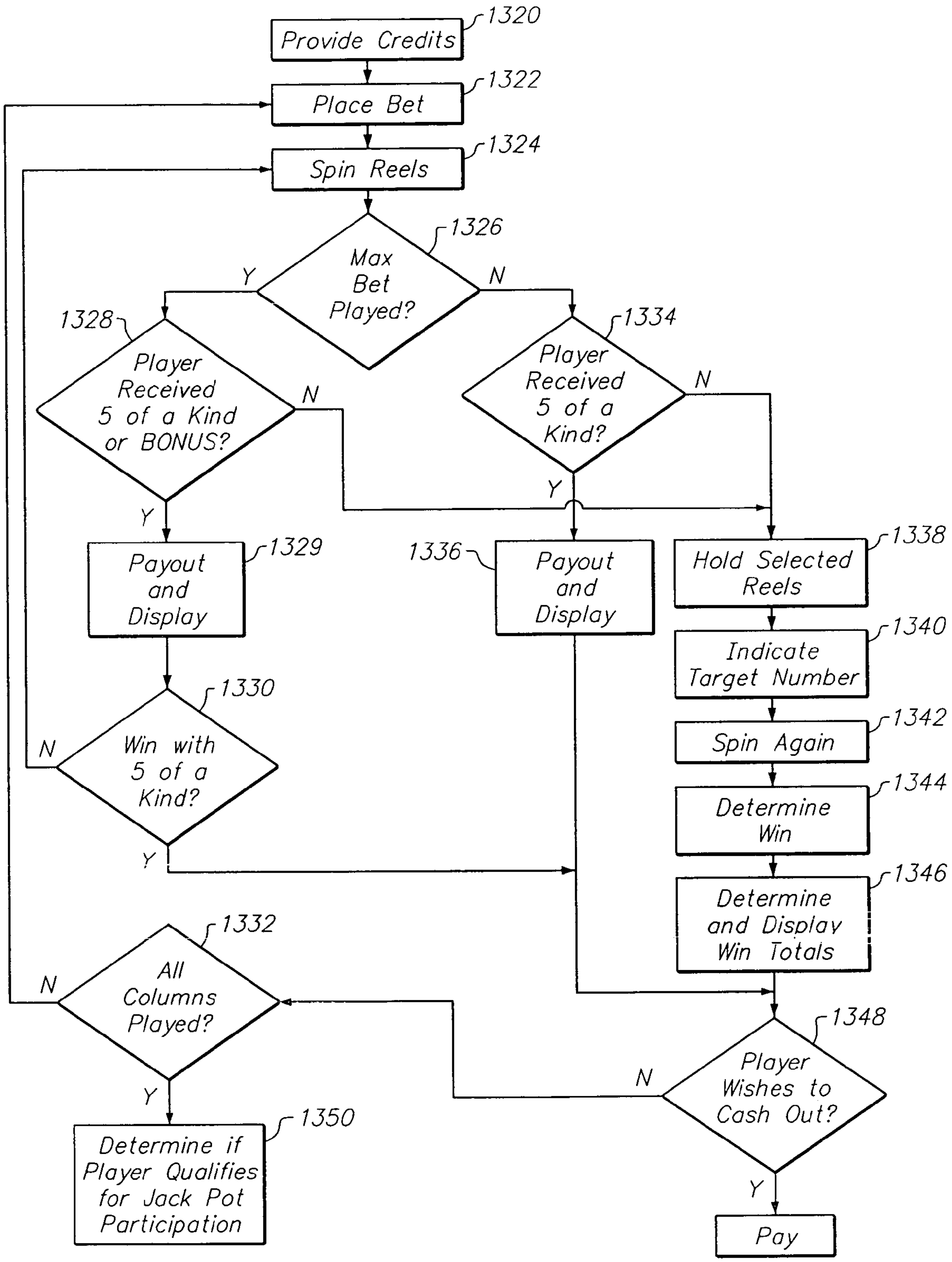
FIG. 13 is a flowchart illustrating the steps of game play of the game having the interface illustrated in FIG. 12.

FIG. 12 illustrates an interface 1215 for implementing the game of Z Jackpot Dice. A scorecard 1201 area is provided in an upper left-hand corner. The scorecard 1201 displays information regarding a particular play event, the pay table for that event, prior played events, and win totals for each prior played event and the current event.

The scorecard 1201 is similar to that of the previous embodiment in many respects, and includes six columns 1202, one for each of the six sides of a dice and the numbers associated therewith. At a top of each column 1202 is provided a target number indicator 1203. In one embodiment, before a target number has been selected, this indicator 1203 comprises a blank dice. A central portion 1204 of each column 1202 indicates the payout for a particular combinations of the target number and/or other numbers. As illustrated, the central portion 1204 is arranged to display payouts for receiving 3 of a Kind, 4 of a Kind, and 5 of a Kind of the target number, as well as a full house, a full house comprising three of the target number and a pair of another number. Preferably, the payouts for all combinations are illustrated in the central portion 1204, regardless of whether a particular column 1202 is active (as described below). However, it is desired that the payout information for the non-active column to be displayed less brightly or less visibly than the information provided in the active column. In this manner, a player is provided with information regarding the possible payouts for receiving combinations in any particular column, but the player's attention is directed to the active column 1202 so as to avoid the player being confused as to which column 1202 is being played.

A bonus value 1206 is provided in the column 1202. The bonus value 1206 comprises a payout value which the player may win in a manner described in more detail below. In a preferred embodiment, the bonus value 1206 comprises a sum which is related to the amount of wagers placed by players when playing the game, such as a percentage of the wagers or retained winnings by the game provider/house.

A win total 1205 is provided at the bottom of each column 1202 for indicating the total payout or winnings to the player for a particular event.

The interface 1215 also includes a number of reels 1241. In the preferred embodiment of this game, five reels 1241 are provided. In a preferred embodiment, each reel 1241 is capable of displaying one of nine symbols: one symbol each comprising a side of a dice, and three symbols comprising a letter in three different colors. Thus, each reel 1241 is capable of displaying dice sides having a one, two, three, four, five and six thereon. The first reel is preferably arranged to display the letter "B" in the colors of red, white and blue. The second reel is preferably arranged to display the letter "O" in the colors of red, white and blue. The third reel is preferably arranged to display the letter "N" in the colors of red, white and blue. The fourth reel is preferably arranged to display the letter "U" in the colors of red, white and blue. The fifth reel is preferably arranged to display the letter "S" in the colors of red, white and blue.

It will be appreciated that the reels 1241 may comprise a displayed image on a video display. In one or more other embodiments, the reels 1241 may comprise mechanical reels having one or more of the images printed thereon and/or capable of being displayed thereon. In general, each reel 1241 is arranged to simulate a throw or spin of an imaginary nine-sided dice having sides displaying the above-described numbers and symbols. Thus, as one aspect of the invention, dice or similar physical items are represented either graphically or on a physical reel.

Below each reel 1241 is a hold button 1243. Each button 1243 is associated with one of the reels 1241 and, as described in more detail below, arranged to permit a player to "hold" the position of a particular reel 1241 in a fixed position.

A number of display areas are provided for displaying related game information. For example, a message area 1247 is provided for displaying the amount of winnings in a jackpot pool. A grand total area 1239 is provided for indicating to the player the total score of the win totals 1205 of all columns 1202. In addition, a qualify score 1240 is displayed so that the player may determined if his or her grant total is sufficiently high to qualify for a bonus or jackpot (as described below).

A new game button 1251 is provided for permitting a player to begin a new game. As described in more detail below, once a player has placed a wager, a text messages area 1245 maybe used to display information, such as game play information. The game play information maybe accessible by pressing an information button 1270.

Display areas are provided for displaying winner paid information 1271, bet information 1272, and credit information 1273. The player may bet or wager credits in single increments with a "Bet 1" button 1255, or may bet or wager a maximum allowed number of credits using a "Bet Max" button 1256.

A spin button 1249 is provided for permitting a player to effectuate a spin of the simulated dice 1241. A player may elect to cash out by pressing a cash out button 1263.

As illustrated, a coin acceptor 1213 and bill acceptor 1214 are provided for accepting wagers by a player. A player card reader 1275 is provided for reading a player card. The player card 1275 may contain credits which can be used to place bets, may contain player information for reading by the machine, and may store game information, such as a qualifying score, as described in more detail below. A ticket dispenser 1276 is provided for dispensing tickets. As described in detail below, the ticket information may comprise game information, such an in-progress or completed game information.

A method of play of the game of Z Jackpot Dice will be described with reference to FIG. 13. In a first step 1320, a player inserts a number of coins (as by coin acceptor 1213), bills (as by bill acceptor 1214) or provides other consideration for playing the game. Consideration may also comprise credits from a player card or the like.

In a step 1322, the player places a wager or bet. In one embodiment, this step comprises the player pressing the "Bet 1" button 1255 or the "Bet Max" button 1256. In one embodiment, a player is permitted to bet between one and five credits. Each credit may comprise any of a number of values, such as $0.05 U.S., $0.10 U.S., $0.25 U.S. or the like. The player may utilize the “Bet 1” button 1255 to place wagers incrementally, or press the “Bet Max” button 1256 to place a maximum bet.

In a step 1324 the player presses the spin button 1249. Upon depressing the spin button 1049, the reels 1241 spin or move (either by mechanical rotation or by computer generated graphics) and then stop. At this point, one symbol is displayed in association with each reel 1241. In the arrangement illustrated in FIG. 12, the symbols six, white O, blue N, one and red S are displayed.

In a step 1326, it is determined if the player placed the maximum bet. If so, then in step 1328 it is determined if the player has received a specific combination of displayed symbols on the reels 1241. In one or more embodiments, a player is declared a winner if the player receives the symbols spelling BONUS. In one embodiment, if the player receives the symbols spelling BONUS in mixed colors, then the player is awarded the bonus amount in the display 1206 for the present column. If the player receives the symbols spelling BONUS in the same colors (i.e. all red, white or blue) then the player is awarded the bonus amount in the display 1206 for all columns 1202.

In one or more embodiments, a player is declared a winner if the player receives the same number on each of the reels 1241 (i.e. all ones, twos), and that number has not already been played. In a preferred embodiment, when the player receives the same number on each of the reels 1241, then the player is awarded the payout for 5 of a Kind as well as the bonus amount.

If the player is a winner, then in step 1329, the total of any winnings is displayed in the total 1205 portion of the column being played. In the preferred embodiment, the column being played is the left-most column 1202 which has yet to be played. The totals of all column 1202 totals are displayed in the total score area 1239.

As an example, if a player receives BONUS spelled in other than symbols of a single color, then the player receives the bonus amount 1206 for that column. That amount is then placed into the total portion 1205 of that column and then indicated in the total score area 1239 along with any other previous total amounts. If a player receives BONUS spelled in a single color, then the player receives the bonus amount 1206 for each and every column. In such event, the totals 1205 for each column 1202 are updated to reflect this winning, as is the player’s total score. If a player receives a 5 of a Kind of a new target number, then the player is awarded the payout for a 5 of a Kind and the bonus amount, and the first open column 1202 is highlighted and the target number displayed thereabove.

In a step 1330, once the player has been declared a winner, it is determined if the player received a win by a 5 of a Kind or receiving the BONUS symbols. If the player received a 5 of a Kind win, then in step 1332, it is determined if the player wishes to cash out (as via a step 1348 as described below).

If the player won by receiving the BONUS symbols, then the player is entitled to respin again in an attempt to obtain a combination of target numbers, as in step 1224. Of course, if the player again receives a win on the first spin, the process repeats. If the player received the same number on each of the reels, i.e. a 5 of a Kind, then the play for that particular target number is completed and the player moves to the next round. In one or more embodiments, the player may be required to place another bet in order to spin again after having received a win by hitting the BONUS win.

If in step 1326 it is determined that the player did not place a maximum bet, then in step 1334 it is determined if the player received a 5 of a Kind of a new target number. If so, then in step 1336, the player is awarded the payout for that combination, and the award is displayed in the appropriate column. It is next determined if the player wishes to cash out in step 1348.

If in steps 1326 and 1334 it is determined that the player did not receive a BONUS win or a 5 of a Kind, then in step 1338, the player is permitted to “hold” any of the reels 1241 which display a number. When the player holds a particular number, that that number becomes the target number. For example, referring to FIG. 12, the player may wish to hold the six displayed in the first column 1202.

In a step 1240, when the player makes a hold selection, the target number is displayed in the first available column 1202 of the scorecard 1201. In one embodiment, the first available column comprises the left-most column 1202 which has not been utilized during the game. Preferably, the target number is illustrated by illustrating the target number on the dice at the top of the column. In the example given above, a dice displaying a six would be displayed in the left-most column 1002.

In one or more embodiments, a player is not permitted to select as a target number a number which has already been played in a particular game. If the player attempts to do so, a message may be displayed in the text message box 1245 to the effect that the selected number has already been played and the player must either select a new target number or spin again. Another spin maybe required where the first spin results in only numbers which have already been utilized. In addition, if the player selects more than one number (such as a simulated dice 1241 displaying a five and another displaying a two) the player be instructed that the action is not permitted and the player must select only one target number. Also, a player is not permitted to hold any of the non-numeric symbols, such as B, O, N, U or S.

Preferably, when a number is selected, the particular column 1202 is highlighted, such as in brightness or a different color, to aid the user in identifying which information is pertinent to the present round of the game. In addition, once a particular target number is selected, the payouts are highlighted in the central payout portion 1204 of the scorecard 1201.

In one or more embodiments, the particular payout is dependent upon the player’s wager, with the payout increasing with an increasing wager. These payouts maybe similar to those described and illustrated above.

In one embodiment, payouts for combinations of target numbers which are eliminated may be removed from the scorecard 1201. For example, the payout for a 3 of a Kind may be removed from the column 1202 being played when the player has already received at least a 4 of a Kind. In addition, the payout which the player has already received upon the first spin for that target number may be highlighted to bring to the attention of the player that he or she has already won. This highlighting may be by displaying the payout in a distinguishing color or brightness or other means available. The word “paid” may be indicated in the particular area of the scorecard 1201 as well.

In accordance with the present invention, in a step 1342, after holding one or more of the reels 1041, or after an indication that no reels 1241 can be held, then the player presses the spin button 1249 again. All of the reels 1241 which were not held spin and then stop, again displaying a number.

In a step 1344, it is determined if the player has received any predetermined winning combinations. If the player did not hold any of the reels 1241, it is possible that on the second spin the player received the symbols spelling BONUS. Preferably, the player is awarded a win as described above for spelling BONUS, if the player has placed the maximum bet. In any event, if the player spells BONUS, that player is entitled to an extra spin in order to permit the player to receive the maximum number of the target numbers.

It is also determined if the player has received a combination of the target number which qualifies as a win. In the embodiment illustrated, the player is a winner if he or she receives at least three of the target number, such as 3 of a Kind, 4 of a Kind or 5 of a Kind of the target number, or if the player receives a full house (i.e. 3 of a Kind of the target number plus a pair of another number).

A win total is displayed in the win total area 1205 of the particular column. This win total may be 0, in the event the player did not receive a winning combination (for example, a player may elect to hold two dice showing the target number after the first spin and not receive any additional dice showing the target number after the second spin, thus not receiving a minimum three of the target number for an award). The total payout to the player may be updated in the winner paid display area 1271.

In a step 1346, the win totals from all win total areas 1205 are displayed, then summed and displayed as a total score in the total score area 1239. Preferably, a qualifying score for a jackpot bonus is displayed in the qualifying score area 1240, again which the player may compare their score.

In a step 1348 it is determined if the player wishes to cash out. This is indicated by a player pressing the collect button 1263. In such event, any accumulated winnings and credits are paid to the player. In that event, the game ends.

If the player wishes to continue the game, it is determined in a step 1332 if all of the columns 1202 of the scorecard 1201 are filled (i.e. all of the target numbers have been played). If so, then the player has completed the game. In a step 1350, the player's total score is then compared to the qualifying score to determine if the player qualifies for participation in the jackpot. If the player qualifies, then in a step 1248, the player is provided with a voucher or the like, in similar manner to that described above. This voucher may be dispensed by the jackpot ticket dispenser 1276.

If all of the columns 1202 of the scorecard 1201 are not filled, the player may, repeating again to step 1224, place a bet or wager. The player may be provided with an indication in the text message box 1245 after a given round that they may place a bet to continue with the game.

In a preferred embodiment, after a particular target number has been played in a round, that target number is removed from each reel 1241. Preferably, the space for the removed target number is made blank. In other embodiments, as described above, the symbol may be replaced or may be darkened to indicate that is no longer usable.

Further, upon the beginning of the next round, the column 1202 for the last target number is darkened or the like so that the player's attention is directed to the now active column 1202. It is preferred, however, that any winning amounts to the player still be displayed in the prior columns 1202 for identification by the player. In addition, it is preferred that the bonus amount for each played column be removed so as to not confuse the player. In such event, the bonus amount for each previously played column is placed in a bonus pool for award to the player in the event the player receives a combination of the letters BONUS in all of the same color.

The game then continues as described above. It will be appreciated that after a first target number has been played, a spin of the reels 1241 may result in a display of all of the remaining numbers and/or the symbols used to replace the already played target number. As the number of played numbers increases, the probability of receiving a target number decreases. For this reason, as detailed above, the payout for receiving a winning combination of each target number increases as the game progresses.

It will be appreciated that the particular symbols which are utilized in the game of Z Jackpot Dice may vary. For example, the non-numeric symbols need not comprise the letters B, O, N, U and S, and do not need to comprise one of each in three different colors. For example, the non-numeric symbols might comprise pictures of fruit or other items. Differing combinations of the non-numeric symbols maybe achieved through color, size or other designation. In addition, a greater or lesser number of non-numeric symbols maybe provided with each reel. For example, there may be only two, or as many as four or more of each of the letters, each in different colors.

It will also be appreciated that in one or more embodiments, player may be permitted to hold one of the non-numeric symbols, i.e. B, O, N, U, and/or S, in an attempt to gain a winning combination of such symbols on a second spin or play.

While a specific order of events has been described for the play of Z Jackpot Dice, the order of events and activities maybe varied from that above. For example, the times at which columns are highlighted, played numbers are indicated at the top of the columns and the like may vary from that described above. In this regard, the above-description is simply exemplary of an implementation of the concepts of the Z Jackpot Dice game.

As indicated above, one or more embodiments of the invention comprise a multi-player game or event. The multi-player game may involve the play of one of the games described above, or other games, such as those described below. For example, in one embodiment, utilizing a local area computer network 301 and a wide area computer network 401, multiple players may play the games of the invention against one another instead of "against the house." Utilizing a local area computer network 301, each participating player deposits money into an individual computer-controlled slot machine 101 for each spin. The player who achieves the highest game score of all of the players who are participating in that multiple player game on the local area computer network 301 wins the money deposited by the various participating players (typically, minus a percentage for the house). The same methodology can be utilized across a wide area computer network 401, allowing players at different physical locations to compete against each other in real time.

In one embodiment, the outcome of the multi-player event is determined from the score or scores of the individual game(s) which the players play. In one embodiment, the outcome of the multi-player event is the award of winnings, such as a monetary jackpot, to one or more of the players based upon their scores. Other awards or winnings maybe awarded, such as prizes including gift certificates an goods.

In one or more embodiments, a jackpot maybe funded from a percentage of the monies wagered by the players of the game(s). In this manner, the jackpot continues to increase over time with play, and over time, may comprise multi-million dollars in size. The jackpot may comprise monies belonging to the establishment offering the game, and may comprise other than cash prizes.

In one or more embodiments, the outcome of the multi-player event is determined at various intervals. The interval may be daily, weekly, monthly, yearly, or the like. The intervals may vary or be evenly spaced. In this configuration, players who play game(s) during the interval of time are eligible to participate in the multi-player event. For example, all players of game(s) during a given week may participate in an associate multi-player event which starts on Sunday at 12:00 a.m. and ends on the next Saturday at 12:00 p.m.

In a preferred embodiment, one or more winners of the multi-player event comprise the players who have achieved certain scores as a result of game play. For example, the winner or winners may be those players with the highest game scores. In one embodiment, a set number of players, such as twenty, who have achieved the highest scores playing the game during a multi-player event are declared winners.

For example, a jackpot may be awarded on the $1^{st}$ of each month, with the players who have achieved the twenty highest scores during the previous month participating in the jackpot. Of course, a gaming establishment may determine the total number of participants.

The awards to the winning players (where there is more than one winning player) may be the same or different. For example, where the award is a jackpot, the amount of the jackpot which is awarded to each player may be even (i.e. divide the jackpot by the number of participating players) or may be on a sliding or other scale where the higher the player's ranking, the greater that player's participation in the jackpot. The jackpot may also be a fixed amount for each player, or be fixed based on their ranking.

Of course, the manner by which a player is determined to be entitled to participate in the jackpot may vary. For example, players having the lowest scores maybe entitled to participate. Other criteria may also be applied for determining the winner or winners of the multi-player event, such as players who score the most points in the shortest time period or the like.

In a preferred embodiment of the invention, the number of players who maybe declared winners of the event increases as the total number of players of the event, and/or the total size of the jackpot, increases. For example, event maybe configured so that five players of the event are declared winners Those of skill in the art will appreciate the enticement of such a multi-player event to a player. In this arrangement, a player need not receive any specific predetermined winning combination or point total. Instead, a player has the opportunity to win the event simply by playing the game they are already playing. Further, each game a player plays may result in a score or other criteria which cause them to win the event, separate from the outcome of any previous game. For example, if a player plays a game and receives a low score, they may play the game again and obtain a high score. Thus, during the multi-player event interval, the player may play multiple games, each of which may be considered independently in determining qualification for winning the event.

In one embodiment, the one or more base or individual games which the player plays are played as wagering type games in which the player places a wager and has the opportunity to win a payout. In other embodiments, as described below, the one or more base or individual games may be played simply for points, scores or the like, without the specific opportunity to win prizes, money or other awards. Instead, those one or more games are played simply as part of the opportunity to win prizes, money or other awards as part of the play of the multi-player event.

As one aspect of the invention, a player may play multiple games as part of the main event. For example, in one embodiment, a player plays the game as many times as possible in a certain time period, and their score for the main event may then comprise the game with the highest score or the aggregate score for all games played during that time period.

In a preferred embodiment, the player must place a wager or pay other consideration to play the game and/or participate in the multi-player event. In an embodiment where each player plays a slot machine 101, the player preferably places a wager or bet directly on or in association with the game to be played. For example, the player may place a wager of $1.00 to play the game. The games of the invention, including the multi-player games, may be played on other than a slot or dedicated gaming machine. For example, the games maybe presented in a networked environment using wireless devices such as cellular phones or personal data assistants (PDAs), as described below. Game data may be transmitted to and from these devices and a game server or other device or system in similar manner to the network 301 described above. In such embodiments, the player's provided value may comprise a game fee which is paid by/charged to the player, including air time or a specific game charge.

Figure 14:
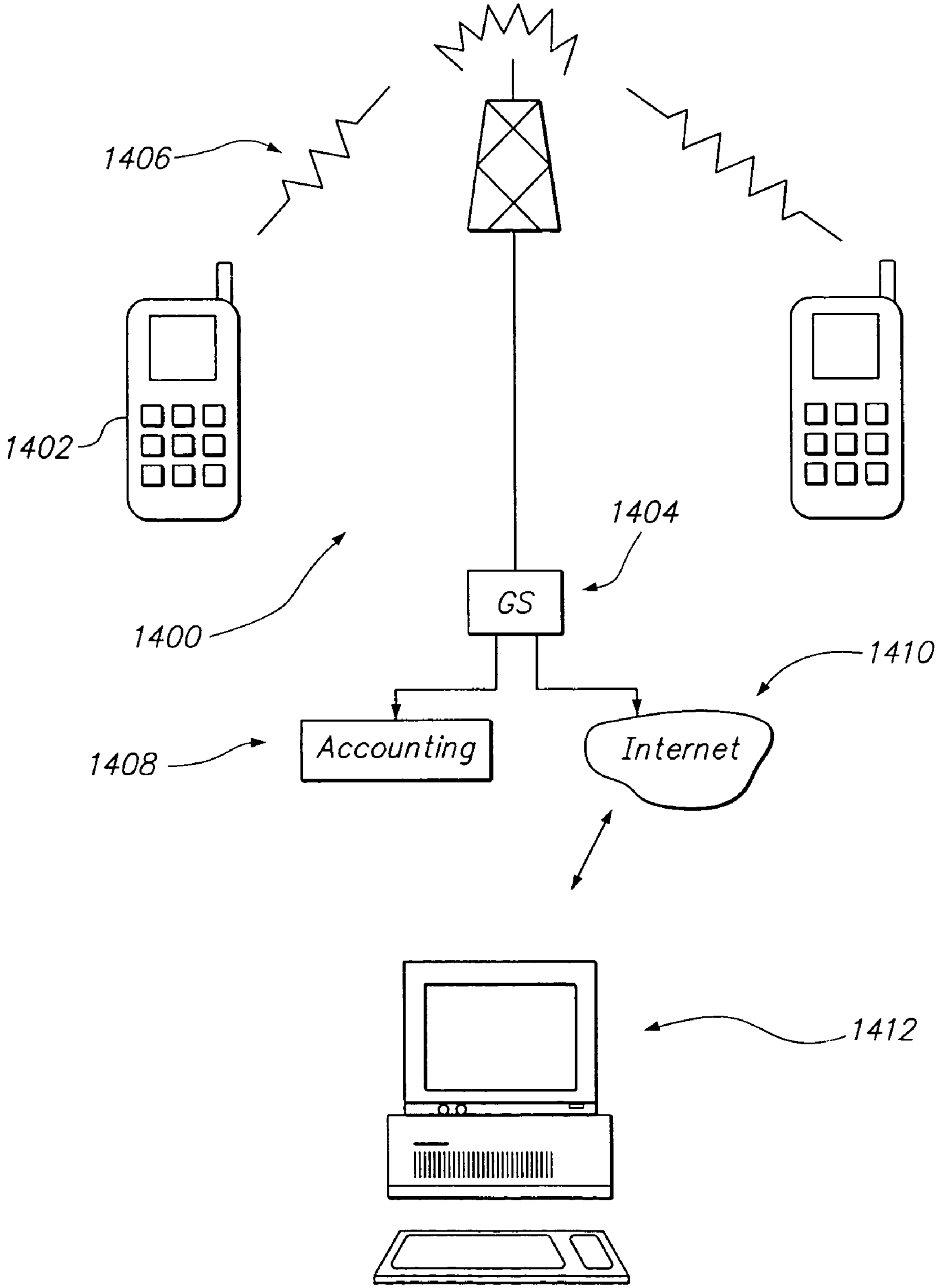
FIG. 14 illustrates another environment for play of games in accordance with the present invention.

Another system or environment for presenting games of the invention is illustrated in FIG. 14. As illustrated therein, the network 1400 includes a variety of wireless devices 1402. These devices may comprise cellular phones, PDAs or the like. Each device 1402 is capable of communicating with a game server 1404 via a communication link 1406, at least a portion of which is wireless. As illustrated, in one embodiment, the game server 1404 is configured to generate and transmit game data to the wireless devices 1402. In one embodiment, a player may establish entitlement to play a game by paying for communication access to the game server 1404, such as by paying for air or connect time.

As illustrated, the game server 1404 maybe in communication at one or more times with an accounting server 1408 or system. This system may track game play win and loss amounts, make credits of air time in the form of wagers or the like, as described below.

In one embodiment, the game server 1404 may also be in communication with other devices. As illustrated, a user may access the game server 1404 from a workstation 1412, such as a kiosk or home computer. Access may be provided via the Internet 1410 or other communication link.

As one aspect of the invention, bets or wagers, or the "value" otherwise required in order for the player to play the game for the opportunity to be paid winnings or be awarded an award, may be placed indirectly. For example, in the embodiment illustrated in FIG. 14, a player's wager may be associated with or comprise air or connect time. For example, a player may pay a certain monetary amount per minute in order to utilize their cellular phone or PDA or utilize a communication link established with their device. All or a portion of that amount maybe attributed to a jackpot amount. In another embodiment, the player may pay an additional amount, such as a surcharge, to play the game and that surcharge or a portion thereof may be applied to the jackpot.

Referring to the embodiment system 1400 illustrated in FIG. 14. A player may pay for air or connect time through a wireless communication provider. The wireless communication provider may provide a communication link to the game server 1404. Players who access the game server 1404, such as by calling a telephone number associated with a communication link to the game server, may be charged an access surcharge. The access time and corresponding surcharge maybe tracked by the accounting server. The surcharge amounts maybe transmitted to the wireless communication provider for inclusion on the customer's bill. All or part of the surcharge amounts maybe applied by the accounting server 1408 to the jackpot. The surcharge or fee maybe calculated in a variety of manners. In one embodiment, the fee is based upon the time the player is connected to the game server via the communication link, from when the communication link is established to when it is terminated, similar to a cellular telephone call. In other embodiments, the fee or surcharge may only be applied during the time the player is actually playing the game.

It is noted that this arrangement maybe applied to other gaming environments. For example, in one embodiment of the invention a player may access a game server from a home computer or the like via a wired or wireless communication link. The player may be charged a fee for this access time in a similar manner to that described above.

Figure 15:
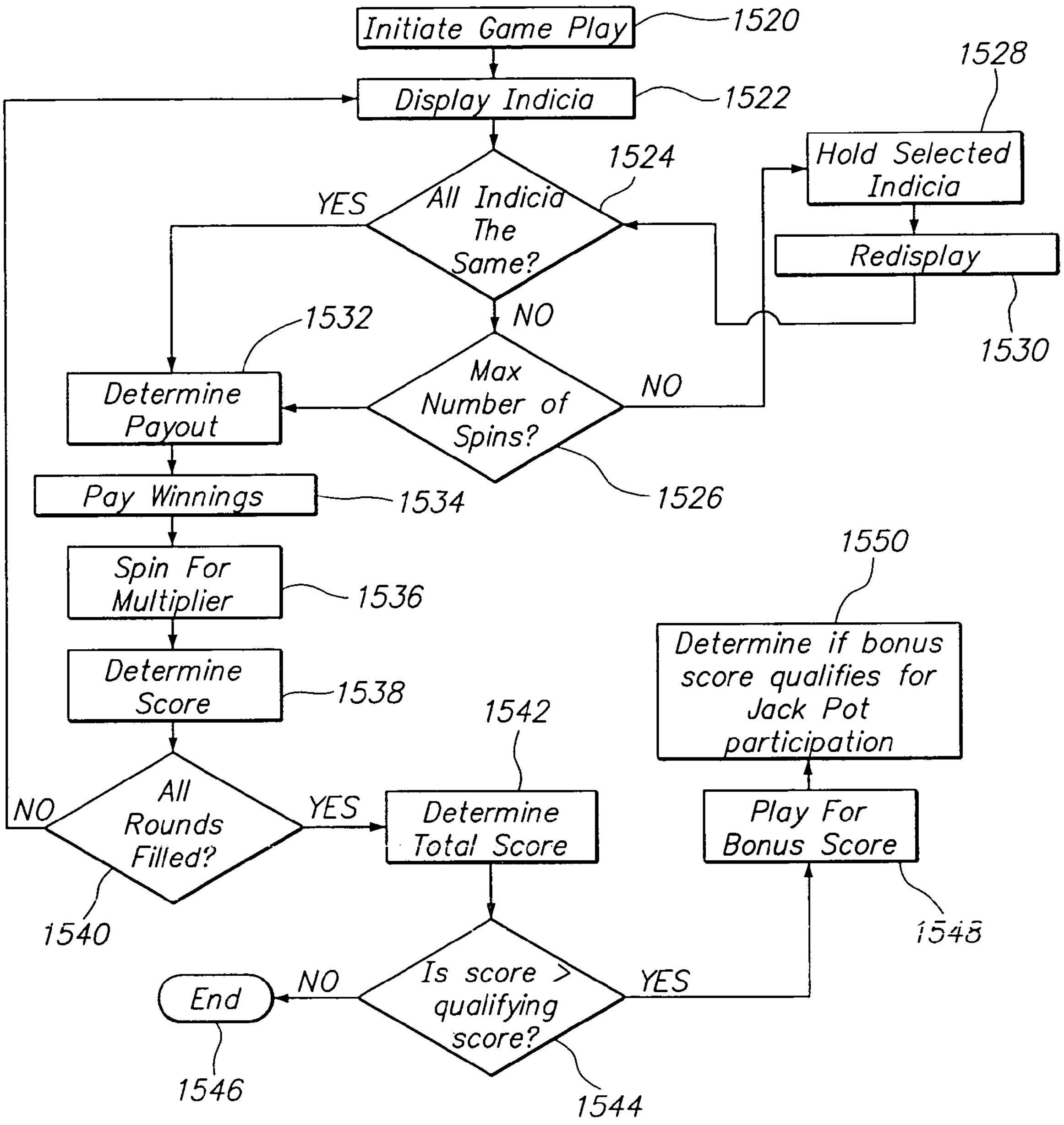
FIG. 15 is a flowchart illustrating yet another embodiment game of the present invention.

As described above, the game of the invention maybe played with numerous variations. Another embodiment of a game of the invention will be described with reference to FIG. 15. This game has particular applicability to a system 1400 such as that illustrated in FIG. 14. In particular, this game is suited to generation of game data by execution of a gaming application at the game server 1404 and then transmission of game data to the devices 1402 for display. In addition, the game maybe funded using air time or similar charges.

In a step 1520, game play is initiated. The game starts by play of a base or individual game. This step may comprise, for example, the player using their wireless device to access the game server.

Similar to the games described above, in one embodiment, the game is a multi-round game in which a player plays for a score. Of course, the game may have other configurations, as described herein. In a step 1522, game indicia are displayed to the player for use in a first round of play. The indicia may be generated at the game server and then corresponding display data may be transmitted to player's device for display. In one embodiment, the indicia comprise images of the sides of dice.

In a step 1524, it is determined if all of the indicia are the same. If so, then in a step 1532, a payout is determined. This step will be described in more detail below.

If in step 1524 all the indicia are not the same, then in a step 1526, it is determined if the player has already used the maximum number of spins. If so, then the payout it determined in step 1532. If not, then in a step 1528, the player is permitted to hold selected indicia. This may be accomplished using buttons, a touch-screen, stylus or other means. The player may hold none, one or more of the indicia. In a step 1530, the indicia which are not held are spun or re-displayed. This may comprise the game server randomly generating new indicia for replacement of the non-held indicia.

In one embodiment, the player may be permitted to hold and replace indicia two times. In other embodiments, the player may be not be permitted to hold and replace indicia at all, or may be permitted to do so other numbers of times. Once the player has exhausted their spins or they have received all of the same indicia, then in step 1532 a payout is determined. In one embodiment, the payout is determined based upon the combination of indicia which the player received. Preferably, higher payouts are provided for greater numbers of matching indicia. The payouts maybe dependent upon the number of points the sum of the "pips" of the matching dice, or maybe independent therefrom (such as based solely upon the particular combination received). In one embodiment, the payout is based upon the greatest number of matching indicia. In the event there are two or more sets of the same number of matching indicia, then the indicia having the largest value (i.e. 6>5) may be selected.

In a step 1534, winnings are paid. Winnings may be paid in the form of credits or otherwise.

In a step 1536, a multiplier is generated. In one embodiment, a multiplier is generated by "spinning" or otherwise displaying two dice. The outcome of the spin is summed, that sum comprising the multiplier. For example, if the player receives a 4 and a 3, then the multiplier is 12. The multiplier may be generated in other ways, such as by random selection of a number, player selection of hidden dice from a set of dice or the like.

In a step 1538, a score for the round is determined. In one embodiment, the score comprises the sum of the pips or points of the greatest number of matching dice, multiplied by the multiplier. For example, if the player has received four 6s and a multiplier of 12, the total point score is $4\times6\times12=288$.

In a step 1540 it is determined if all of the rounds have been completed. In one embodiment, the game comprises a maximum of six rounds. If all rounds have not been completed, then the game returns to step 1522 with another set of indicia being displayed. If all rounds have been completed, then in a step 1542 a total game score is determined. In one embodiment, this score comprises the sum of the scores for each round.

In a step 1544 it is determined if the game score is greater than a qualifying score. If not, then the game ends in step 1546. If so, then in a step 1548, the game is played again in the form of a bonus game in which a player plays for a bonus score 1548. Preferably, the play of the game for the bonus score is the same as that described above. Preferably, the player plays for a bonus score which entitles them to a jackpot amount in similar fashion to that described above. For example, the player attempts to receive a score, such as the highest score, for all bonus games played during a period of time. At the end of the predetermined period of time, in a step 1550 is determined if the player has won or has qualified to participate in, the jackpot. If so, the player is awarded a jackpot winning, such as a very large monetary award.

Preferably, the qualifying score is set sufficiently low that it is frequently attained, and thus entices the player to play the game in an attempt to play the bonus game. Round results, round scores, multipliers and the like are preferably displayed to the player, such as via a game board. Data representing the game board may be generated by the game server and transmitted to the player's device for generating the display.

Variations of the method of game play are contemplated. For example, when implementing the game with a system 1400 such as illustrated in FIG. 14, steps 1532 and 1534 may be eliminated. Instead, the player may play the game for a score only, attempting to reach the bonus round. If the player reaches the bonus round, the player may then be entitled to win the jackpot. In this embodiment, much higher jackpots may be awarded because no "intermediate" winnings are awarded for play of the main game. This also simplifies the game play, eliminating the need to pay remote players for round winnings. If a player wins the jackpot, the player may be paid via their wireless communication account or by using information associated with that account to identify the player to the game provider.

Use of a multiplier is preferred, but not required. The multiplier, as disclosed, has the benefit of creating a much larger score distribution, allowing for higher scores and more excitement.

Various numbers of indicia maybe displayed per round, such as five or six dice indicia. In addition, a particular indicia has been used, that indicia may become inactive for the remainder of the game. As described herein, that indicia may be removed from play, may be darkened or the like to indicated that it is inactive. When indicia are removed from play, as described above, the payouts associated with remaining combinations may increase, reflecting the reduced odds of receiving combinations of indicia.

It is contemplated that various features of the game just described may be applied to other games, including the other games described herein. For example, a multiplier maybe used in association with the generation of the scores of the other embodiment games of the invention.

The bonus or jackpot feature may also be applied to other games. For example, the jackpot feature maybe applied to the well known game of video poker. In one embodiment, individual players play one or more games of video poker for a score, such as points or credits. In one embodiment, the players play multiple games, each game comprising a "round." The score achieved by the player as a result of their game play (such as the score for a single game or the aggregate of all rounds) is compared to a threshold. If the player qualifies, the player is permitted to play one or more of the games for a bonus score.

This aspect of the game maybe applied to other games, such as Blackjack. These games maybe modified so that points are awarded as well as credits or winnings for each individual game. Further, hands maybe differentiated so that differing numbers of points are attainable. For example, in the game of video poker, 50 points maybe awarded for a flush of Hearts, while only 45 points awarded for a flush of Diamonds. In this manner, a greater distribution of points can be provided. In addition, a multiplier or similar feature may also be utilized to generate the score for each game or round, again contributing to a wider range of scores for the games, and thus making qualifying more interesting.

As one aspect of the invention, a player who qualifies is preferably permitted to play the game or games in the bonus round without placing an additional wager. This feature further entices players to play the base or main game to qualify, since once they qualify, it costs the player nothing to play the bonus game for a chance at winning the bonus or jackpot.

As one aspect of the invention, a player may be permitted to play their bonus game or games for their bonus score at any time. For example, a player may desire to wait and play their bonus game close to the time the bonus interval is over, as at that time they may feel they have a better chance of winning.

In one embodiment, a player may track whether or not they are in the running to win the jackpot during a given payout interval. For example, the highest score or scores may be made available to the player, such as by being posted to the player's device, via a website or the like. The player may compare their score(s) against these scores to determine if they are still entitled to participate in the jackpot. A player may determine that their score is no longer high enough to qualify for jackpot participation (such as by reason of a number of later players receiving higher scores and displacing the player from the top twenty highest scores). In such event, a player may play one or more games before the award of the next jackpot.

In one embodiment, each game score is associated with a game number. The highest (or otherwise qualifying game scores) maybe posted with the game numbers. In one embodiment, game results maybe printed on a player voucher. The player may then redeem the voucher for their jackpot award at a gaming establishment or other location.

Alternatively, achieving a predetermined score may be utilized for awarding a predetermined jackpot. For instance, if a player achieves a perfect score, meaning the theoretically highest score for each category, then a jackpot may be awarded for such achievement.

It will be appreciated that the predetermined winning combinations and their payouts may vary from those described and illustrated herein. For example, instead of attempting to achieve matching indicia, a player may be directed to achieve a full house, a straight or other combinations. In one or more embodiments, especially when bonuses or jackpots are not awarded, winning combinations may include the more commonly obtained 2 pair or even a single pair. It will be appreciated that when a portion of the wager is diverted to the generation of bonus and jackpot payouts, paying on such commonly occurring combinations is less desirable, as the hold for the game may be minimal or non-existent to the house.

In addition, the total number of reels or simulated dice maybe varied. In the examples illustrated, 5 or 6 of such simulated dice or reels are illustrated and described. However, the games may be played with a lesser number or greater number (i.e. such combination as 7 of a Kind being obtainable, or a maximum of 4 of a Kind). Those of skill in the art will appreciate that as the total number of available combinations changes, the payouts may need to be changed in order to both entice a player into playing and yet prevent the house from risking loss.

In the above-described games, and referring again to FIGS. 5B and 10, a player may preferably save a game in progress by pressing the touch-sensitive save-restore game button 559/pause game button 1059. The computer program 601 then utilizes the machine-readable medium reading and writing device 129 to write the present scores and game states to a card, voucher (such as a printed ticket or token) or other medium which the player can take with them. The player may later resume the saved game by inserting such card or voucher of machine-readable medium into the reading and writing device 129 of any computer-controlled slot machine 101. The saved game information is then read from the card or voucher to initialize the conditions and states of the computer-controlled slot machine 101. In various embodiments, a magnetic or optical or semiconductor medium may be used as desired to store and transfer scores and game states and other pertinent data on such card or voucher produced by the video slot machine 101. In one or more embodiments, when the player elects to pause or save a game in progress, game state information is generated. This information maybe stored to the medium which is provided to the player, or maybe stored remotely, such as at a central server associated with the games when they are linked. In such event, a code or other information need only be stored or associated with the medium provided to the player. When the code is read or inputted into a game at a later time, the code may cause the game to access the game state information stored separately from the medium. In this manner, a player may be permitted to cease playing a game at a first time and pickup that same game at a later time, and even at a different gaining station offering the game. It will be appreciated that such a similar function may be applied to the various game described herein as well as other games now known or later invented. Further, it should be noted that the games maybe arranged so that a player may engage the pause function, as well as the cash-out and other features of the games, at times other than those specifically described above. For example, a player maybe permitted to pause a game at any point, and not specifically only after the completion of a given round of play.

It will be appreciated that games in accordance with the invention need not be the same as those described above. In one or more embodiments, the game may comprise simply implementation of the basic concept. In such an arrangement, the game may includes the steps of a player placing a wager, the providing of a set of symbols, displaying a number of the symbols from the set of symbols, the player having the opportunity to hold none, one or more of the symbols, displaying replacements symbols to those which are not held, comparing the final set of displayed symbols to predetermined winning combinations of symbols to determine if the player is entitled to a winning payout, and then removing from the set of symbols at least one of the symbols, thereby reducing the possible number of combinations achievable thereafter by the player. Preferably, as the number of combinations which the player may achieve are reduced, the payout for achieving a winning combination increases.

In various embodiments, the symbols or indicia used in the play of the game comprise or include the faces or sides of dice (simulated or real). Of course, such games may utilize other indicia. For example, such aspects of the game maybe applied to a "slot-type" machine which includes reels displaying symbols such as cherries, 7s, bells and the like. As rounds, hands or the like of play are completed, the symbols may be removed randomly or in accordance with winnings combinations received by the player.

In such a game, other features such as jackpots and bonuses may be omitted. On the other hand, any combination of jackpots or bonuses as described herein maybe applied to a variety of other games besides the games herein.

A number of other alternate embodiments or alternate arrangements to the games other than as described above are contemplated. First, it will be appreciated that one or more of the features of any one game described above maybe applied to another. By way of example, a player maybe permitted to "hold" the simulated dice in the game of Z Sixty Six as well as in the games of Check and Z Hot Dice. In addition, the replacement symbols utilized in the games of Check and Z Sixty Six may, as in the case of Z Hot Dice, comprise symbols which either prevent a player from obtaining what appears to be a unique or winning combination of replacement symbols, or may comprise a combination of symbols which permits a player to receive a winning combination of replacement symbols.

In any of the embodiments, the replacement symbols may comprise no symbol at all, but comprise a blank. In other embodiments, instead of "replacing" the symbols, the symbols may be "deactivated." In one embodiment, the "deactivation" may be denoted by darkening the symbol or changing its color to denote the different between that symbol and "active" symbols.

A variety of criteria maybe applied to the games of the invention for determining when a player has qualified or completed a round or category. For example, as described above, a player may be required to receive at least 3 of a Kind to start play. In one or more embodiments, a player may be required to play until they achieve at least a 3 of a Kind before any score is attributed to a particular category or round (i.e. not just the first). For example, after completing a first target number if on the next two spins the player achieves at most a pair, the player may be required to place an additional wager and utilize two more spins in an attempt to gain at least 3 of a Kind. In other embodiments, such as described above, the player may receive a zero score if they do not receive a winning combination on each set of spins. For example, after completing a first target number or category, if on the next two spins a player receives only a pair of the same indicia, the score for that category may be credited as zero, and then the player forced to move to the next target number or category.

In one or more embodiments of the invention, a player may be declared a winner for receiving other combinations of symbols/events. For example, a player may be paid a special award or winning or receiving at least 4 of a Kind of each target number. For example, in the embodiment illustrated in FIG. 12, an additional column 1202 maybe provided which indicates the amount of a bonus the player may receive for obtaining a 3 of a Kind, 4 of a Kind or the like of each of the target numbers in the other columns. Such a bonus maybe utilized in addition to a "per-column" bonus as described above in the game of Z Jackpot Dice or the jackpot as described herein.

In one or more embodiments of the invention, may as described above with respect to the game of Check, not include the step of removing one or more of the symbols as game progresses. Instead, the player may continue play, attempting to achieve winning combinations, jackpots, bonuses (or other of the features/elements) using the same set of symbols as play progresses.

As used herein, the term "computer-controlled slot machine" denotes a computer controlled machine which preferably facilitates wagering. As disclosed above, such a wager maybe placed directly or indirectly. It will be appreciated that one or more aspects of the machine, including the interface or what is referred to herein as the touch sensitive display may be electrical, mechanical and/or electro-mechanical in nature. For example, while the buttons may comprise touch-sensitive areas of a display, they may comprise electro-mechanical buttons which are activated by mechanical movement (such as depression) by a player. In addition, the simulated dice may, instead of comprising solely computer generated images, actually comprise dice or dice faces mounted on a rotating reel and arranged to stop in controlled positions. The simulated dice or other symbols maybe provided in a variety of other manners, such as by laser light generation. The dice or other symbols are referred to in certain instances as "simulated," but could actually comprise faces of actual physical dice. The displays and display areas may comprise CRT type displays, LCD or LED displays or any other means for displaying information now known or later developed.

It will be appreciated that various features of the present invention may be applied to existing games or games later developed. For example, the feature of permitting a player to "pause" a game and then continue the game at one or one of several gaming machines maybe applied to present or future games. For example, the pause feature maybe applied to video poker games or the like. Likewise, the feature of having bonuses associated with more than one event and/or cumulative bonuses may be applied to present or future games. For example, a typical slot machine maybe configured to include particular winning combinations which, when received by a player, entitle the player to a first bonus. Additional bonuses may be won by receiving other combinations, and a total bonus may be awarded for receiving yet another special combination.

Another feature which maybe applied to the games of the invention involves the duplication of displayed dice or symbols after a spin into additional "hands." For example, after a first spin, a player may elect to hold a target number which is displayed three times (i.e. a 3 of a Kind). These same symbols may then be displayed in one or more additional rows or hands. The player may then be permitted to spin again, in an attempt to achieve a winning combination in any or all of the hands or rows. In the example given, either 2 or 3 additional symbols (depending on whether each row had a maximum of 5 or 6 symbols) would be displayed randomly to fill each row. The combination of the newly displayed symbols and the three originally held symbols would then be evaluated to determine if the player had won. The player may be awarded a payout for each winning row, or only for rows for which the player placed a wager. Alternatively, the player might be permitted to retain the highest winning combination from the several rows for determining the payout to be awarded in the column for that target number.

It will be understood that the above described arrangements of apparatus and the method therefrom are merely illustrative of applications of the principles of this invention and many other embodiments and modifications maybe made without departing from the spirit and scope of the invention as defined in the claims.

I claim:

1. A method of playing a multi-player game having a jackpot feature comprising:

initiating a game play period;

presenting individual games to a plurality of individual players;

determining a score for each individual game based upon an outcome of each individual game;

determining if said score meets a required criteria;

ending said multi-player game for each individual game where the individual game score does not meet said required criteria;

closing said game play period; and permitting individual players who received an individual game score which met said required criteria during said game play period to participate in a jackpot portion of said multi-player game comprising:

providing a jackpot amount;

determining a pool of one or more individual players from said individual players entitled to participate in said jackpot portion of said game, based upon the individual game scores of said individual players; and awarding said one or more individual players of said pool at least a portion of said jackpot amount.

2. The method in accordance with claim 1 wherein said individual games comprise video poker games.

3. The method in accordance with claim 1 wherein said individual games comprise multi-round dice games.

4. The method in accordance with claim 3 wherein said score for each individual game comprise a total of scores associated with rounds of said multi-round dice game.

5. The method in accordance with claim 1 including the step of awarding a payout for predetermined winning results of said individual games.

6. The method in accordance with claim 1 including the step of accepting a wager for play of each individual game and funding said jackpot amount at least in part from said wagers.

7. The method in accordance with claim 6 wherein said wager comprises a time-based fee for connectivity of a communication link between a device used to present said individual game to said individual player and a game server.

8. The method in accordance with claim 1 wherein said game play period comprising a predetermined period of time selected from the group consisting of: a day, a week, a month and a year.

9. The method in accordance with claim 1 wherein said step of permitting each individual player who received a individual game score which exceeded said threshold during said game play period to participate in a jackpot portion of said multi-player game comprises playing a second individual game for a second score and determining said pool from said scores of said second individual games.

10. The method in accordance with claim 1 wherein said step of determining if said score for each game meets required criteria comprises determining if said score for each game exceeds a predetermined minimum score.

11. A method of playing a multi-player game having a base game feature and a jackpot feature comprising:

establishing communication links between a game server and individual players of game devices, where at least a portion of each communication link comprises a wireless communication link;

transmitting individual game information between the game server and each game device via the corresponding communication links;

determining a score for each individual game based upon an outcome of each individual game;

determining if said score for each game exceeds a predetermined threshold;

ending said multi-player game for each individual game where the individual game score does not exceed said threshold;

permitting each individual player who received a individual game score which exceeded said threshold during a predetermined game play period to participate in a jackpot portion of said multi-player game comprising:

providing a jackpot amount;

determining a pool of one or more individual players entitled to participate in said jackpot based upon the individual game scores of said individual players; and awarding said one or more individual players of said pool at least a portion of said jackpot amount.

12. The method in accordance with claim 11 wherein said step of establishing communication links comprises forming communication links between said game server and cellular communication devices of individual users.

13. The method in accordance with claim 11 further including the step of charging each player a fee for playing said multi-player game, said fee based upon the length of a communication link is established between a player's game device and said game server.

14. The method in accordance with claim 13 wherein said jackpot amount is funded at least in part from said fees paid by said players.

15. The method in accordance with claim 11 wherein said game devices comprise cellular communication devices.

16. The method in accordance with claim 11 wherein said individual games comprise video poker games.

17. The method in accordance with claim 11 wherein said individual games comprise multi-round dice games.

18. The method in accordance with claim 17 wherein said score for each individual game comprise a total of scores associated with rounds of said multi-round dice game.

19. The method in accordance with claim 11 wherein said pool comprises one or more players with the highest individual game scores.

* * * * *